US012687985B2

(12) United States Patent
Beygi et al.

(10) Patent No.: US 12,687,985 B2
(45) Date of Patent: *Jul. 21, 2026

(54) REMOTE DIRECT ATTACHED MULTIPLE STORAGE FUNCTION STORAGE DEVICE

(71) Applicant: Samsung Electronics Co., Ltd., Suwon-si (KR)

(72) Inventors: Amir Beygi, San Jose, CA (US); Jimmy Lau, Santa Clara, CA (US); Ramdas P. Kachare, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,420

(22) Filed: Jul. 14, 2023

(65) Prior Publication Data

US 2023/0359395 A1 Nov. 9, 2023

Related U.S. Application Data

(63) Continuation of application No. 17/105,497, filed on Nov. 25, 2020, now Pat. No. 11,704,059.

(Continued)

(51) Int. Cl.
*G06F 3/06* (2006.01)

(52) U.S. Cl.
CPC ............ *G06F 3/0659* (2013.01); *G06F 3/061* (2013.01); *G06F 3/0664* (2013.01); *G06F 3/0679* (2013.01); *G06F 2212/7203* (2013.01)

(58) Field of Classification Search
CPC ...... G06F 3/0659; G06F 3/061; G06F 3/0664; G06F 3/0679; G06F 2212/7203
See application file for complete search history.

(56) References Cited

U.S. PATENT DOCUMENTS 8,291,135 B2 10/2012 Subramanian et al.
8,447,909 B2 5/2013 Corrigan et al.
(Continued)

FOREIGN PATENT DOCUMENTS

CN 103116517 A 5/2013
CN 106708423 A 5/2017
(Continued)

OTHER PUBLICATIONS

Final Office Action for U.S. Appl. No. 17/105,497, mailed Oct. 27, 2022.

(Continued)

*Primary Examiner* — Kalpit Parikh
(74) *Attorney, Agent, or Firm* — Renaissance IP Law Group LLP

(57) ABSTRACT

A multiple function storage device is disclosed. The multiple function storage device may include an enclosure, a storage device associated with the enclosure, and an bridging device associated with the enclosure. The storage device may include a connector to receive a first message using a first protocol originating at a host, a physical function (PF) and a virtual function (VF) exposed by the storage device via the connector, storage for data relating to the first message, and a controller to manage writing a write data to the storage and reading a read data from the storage. The bridging device may include an embedded network interface controller (eNIC) to receive a second message using a second protocol from the host, a write buffer to store the write data to be written to the storage device by the host, a read buffer to store the read data to be read from the storage device for the host, a bridge circuit to translate the second message using the second protocol into the first message using the first protocol, and a root port to identify the storage device and (Continued)

to transmit the first message to the VF. The bridging device may be configured to map the host to the VF.

17 Claims, 16 Drawing Sheets

Related U.S. Application Data

(60) Provisional application No. 63/075,092, filed on Sep. 4, 2020, provisional application No. 62/971,902, filed on Feb. 7, 2020.

(56) References Cited

U.S. PATENT DOCUMENTS

| | | | |
|---|---|---|---|
| 9,658,782 B2 | 5/2017 | Romem et al. | |
| 9,747,039 B1 | 8/2017 | Coleman et al. | |
| 9,804,880 B2 | 10/2017 | Madtha et al. | |
| 9,990,304 B2 | 6/2018 | Tomlin et al. | |
| 10,079,889 B1 | 9/2018 | Malwankar et al. | |
| 10,453,530 B2 | 10/2019 | Lee et al. | |
| 10,534,552 B2 | 1/2020 | Hu et al. | |
| 10,719,474 B2 | 7/2020 | Kachare et al. | |
| 10,769,098 B2 | 9/2020 | Joshua et al. | |
| 11,507,404 B2 | 11/2022 | Yang | |
| 2012/0042034 A1 | 2/2012 | Goggin et al. | |
| 2015/0317088 A1* | 11/2015 | Hussain | G06F 3/0688 |
| | | | 711/103 |
| 2015/0317176 A1 | 11/2015 | Hussain et al. | |
| 2016/0378353 A1* | 12/2016 | Schmisseur | G06F 3/0665 |
| | | | 711/114 |
| 2017/0177222 A1 | 6/2017 | Singh et al. | |
| 2017/0286363 A1* | 10/2017 | Joshua | G06F 3/0688 |
| 2017/0344259 A1* | 11/2017 | Freyensee | G06F 3/0632 |
| 2018/0052624 A1* | 2/2018 | Marripudi | G06F 11/108 |
| 2018/0088978 A1 | 3/2018 | Li et al. | |
| 2018/0284990 A1* | 10/2018 | Kachare | G06F 3/0635 |
| 2018/0307521 A1* | 10/2018 | Pinto | G06F 12/0238 |
| 2018/0335971 A1 | 11/2018 | Borikar | |
| 2019/0196996 A1* | 6/2019 | Balakrishnan | G06F 13/30 |
| 2019/0324969 A1* | 10/2019 | Fujimoto | G06F 3/067 |
| 2019/0377516 A1* | 12/2019 | Rao | G06F 3/0683 |
| 2020/0034314 A1 | 1/2020 | York et al. | |
| 2020/0042246 A1 | 2/2020 | Maharana et al. | |
| 2020/0050470 A1 | 2/2020 | Guo et al. | |
| 2020/0192848 A1 | 6/2020 | Maroney et al. | |
| 2020/0201575 A1 | 6/2020 | Mizrahi | |
| 2020/0310657 A1* | 10/2020 | Cayton | G06F 3/067 |
| 2020/0380361 A1 | 12/2020 | Tanach | |
| 2021/0072927 A1 | 3/2021 | Yang et al. | |

FOREIGN PATENT DOCUMENTS

| | | |
|---|---|---|
| CN | 108885597 A | 11/2018 |
| CN | 109983439 A | 7/2019 |
| EP | 2772854 A1 | 9/2014 |
| KR | 20190040886 A | 4/2019 |
| TW | I515572 B | 1/2016 |

OTHER PUBLICATIONS

Notice of Allowance for U.S. Appl. No. 17/105,497, mailed Mar. 3, 2023.

Office Action for U.S. Appl. No. 17/105,497, mailed Apr. 14, 2022.

Poland, Ashley, "What Is a PCI Express Root Port?", https://www.techwalla.com/articles/what-is-a-pci-express-root-port, 2017, 1 page.

\* cited by examiner 1020
1030

Start

1505

Generate multiple messages using the second protocol for the first message

1510

Send the multiple messages to the VF exposed by the storage device

End

REMOTE DIRECT ATTACHED MULTIPLE STORAGE FUNCTION STORAGE DEVICE

RELATED APPLICATION DATA

This application is a continuation of U.S. patent application Ser. No. 17/105,497, filed Nov. 25, 2020, now allowed, which claims the benefit of U.S. Provisional Patent Application Ser. No. 62/971,902, filed Feb. 7, 2020, and U.S. Provisional Patent Application Ser. No. 63/075,092, filed Sep. 4, 2020, all of which are incorporated by reference herein for all purposes.

FIELD

The inventive concepts relate generally to storage devices, and more particularly to using storage devices by multiple remote hosts.

BACKGROUND

Virtual machines may provide a way for host servers to support different functions in response to different requests of the servers. But some storage devices may offer a single controller, which may be used with only one host at a time.

In some respects, an increase in the number of storage devices may be employed by the storage provider to enable more virtual machines to concurrently connect to storage devices. But more storage devices may lead to additional expense to purchase the storage devices (and servers in which to house them), greater networking resources, and more energy expenditure to power the storage devices.

In other respects, software may be included at the host servers, for example to enable multiple virtual machines (which may appear as separate hosts) to communicate with the storage devices. But adding software to the host servers may serve to increase the server complexity and add additional computational overhead.

BRIEF DESCRIPTION OF THE DRAWINGS

The drawings described below are examples of how embodiments of the inventive concept may be implemented, and are not intended to limit embodiments of the inventive concept. Individual embodiments of the inventive concept may include elements not shown in particular figures and/or may omit elements shown in particular figures. The drawings are intended to provide illustration and may not be to scale.

DETAILED DESCRIPTION

Figure 1:
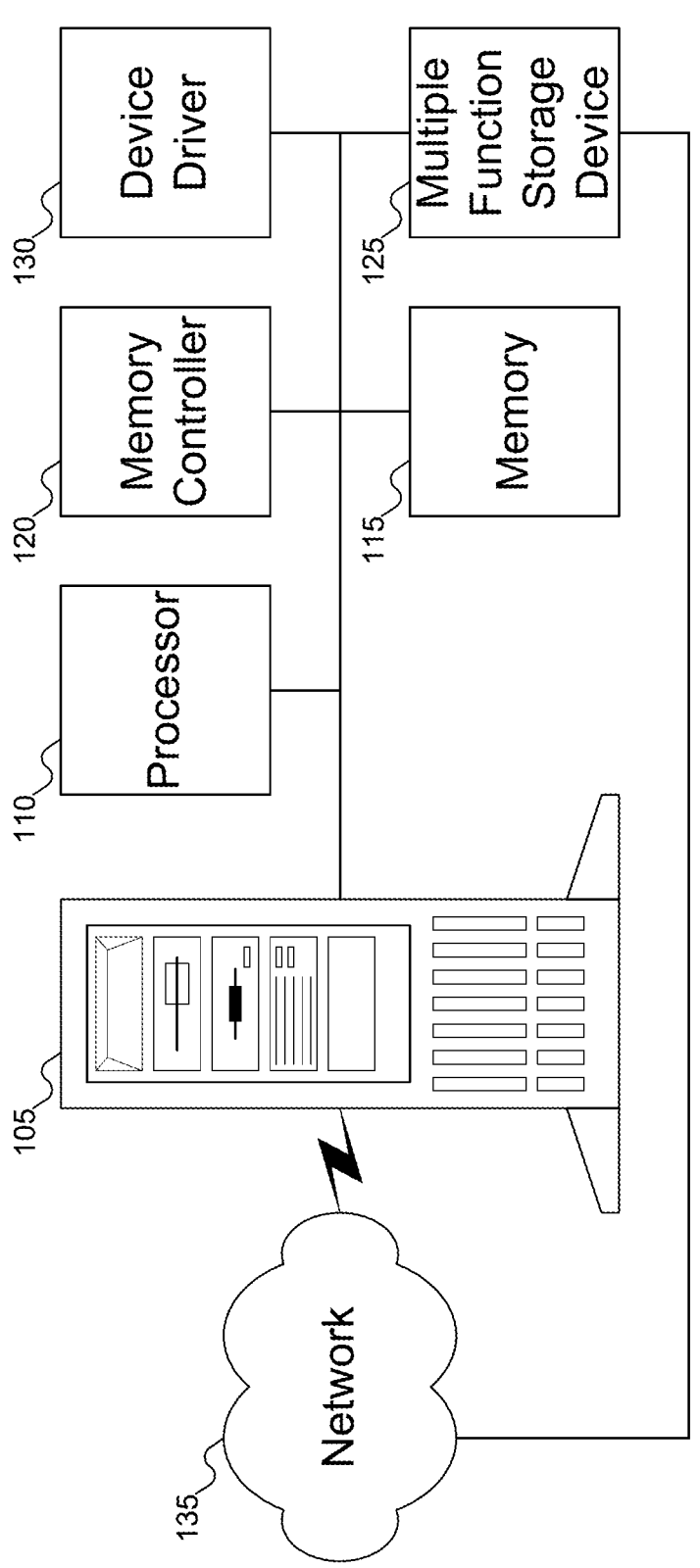
FIG. 1 shows a machine including a multiple function storage device equipped to support multiple hosts, according to embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Non-Volatile Memory Express over Fabrics (NVMeoF) may allow storage devices such as Solid State Drives (SSDs) to be connected over a network. NVMeoF SSDs may support a remote direct-attached architecture with low latency over a network protocol including, but not limited to, Ethernet, Transmission Control Protocol/Internet Protocol (TCP/IP), User Datagram Protocol/Internet Protocol (UDP/IP), Remote Direct Memory Access (RDMA), Fibre Channel, or other protocols over networks. NVMeoF SSDs may be connected to one or more remote hosts through a switch, such as an Ethernet switch or another network switch, which may be present in or mechanically and/or electronically coupled with the chassis. The NVMeoF SSDs may operate independently of each other, and the chassis may appear to the remote host as a pool of SSDs.

An NVMeoF Ethernet SSD (eSSD) chassis may contain, for example, 48 SSDs. NVMeoF SSDs may be connected to one or more remote hosts through an Ethernet switch or some other network switch present in the chassis. The chassis may also contain a Baseboard Management Controller (BMC) device (or a processing element configured to perform operations similar to a BMC) that may manage at least a portion of the SSDs and the enclosure. Each SSD may have an associated NVMeoF driver running on the remote host. The SSDs may operate independently of each other: such a chassis may appear as a pool of SSDs (Just a Bunch of Flash, or JBOF) to the remote host.

In some respects, NVMeoF SSD may be more complex (and therefore more expensive) than Non-Volatile Memory Express (NVMe) SSDs. Further, because a controller may be associated with a single host, multiple hosts may not be able to access data on a single SSD concurrently with each other. With the increase in the use of virtualization, associating a particular controller with a single virtual machine (VM) means that other VMs may not be able to access that SSD.

In various embodiments of the inventive concept, the disclosed systems may include relatively compact, low-latency multi-storage function devices appearing to be, for example, NVMeoF storage devices that may communicate with multiple independent remote hosts or VMs, without requiring any special applications, drivers, or NVMe controllers. In some embodiments of the inventive concept, the storage devices may include, for example, a Field Programmable Gate Array (FPGA) and an NVMe controller, which may include single root input/output virtualization (SR-IOV) support, which may expose multiple functions of the storage device, each of which may be presented as a separate storage device to remote hosts. SR-IOV provides a mechanism by which access to a storage device in a machine may be virtualized by using Physical and Virtual Functions of the storage device. By having virtualization handled within the storage device, such implementations avoid the overhead associated with the processor and some virtualization intermediary handling the management of separate system images. More information about SR-IOV may be found in, for example, Single Root I/O Virtualization and Sharing Specification Revision 1.1, published Jan. 20, 2010, by the Peripheral Component Interconnect Special Interest Group (PCI-SIG), which is hereby incorporated by reference for all purposes.

Using such a multi-storage function device, multiple VMs may concurrently communicate with a dedicated storage controller without additional overhead: for example, without adding a side-band communication channel between the hosts, and without significantly increasing the complexity of an associated hypervisor. Thus, using such a multi-function device may be an economic and energy efficient approach enabling multiple remote hosts connecting concurrently to a single storage device.

Multi Storage Function NVMeoF Storage Device

A storage device may implement the NVMeoF host protocol over Ethernet and other network transports. Although the host interface may be NVMeoF, a standard Peripheral Component Interconnect Express (PCIe) SSD controller with virtual function (VF) support may be used rather than an NVMeoF storage device.

In some embodiments of the inventive concept, the SSD controller may expose one PCIe Physical Function (PF) and a set of VFs. External logic may be used to implement a network host interface and logic to interface to the VFs of the SSD. The external logic may be implemented in a FPGA or a System on a Chip (SoC) processor that may be part of the storage device of the SSD. The external logic may perform an NVMeoF-to-NVMe bridging function. An external NVMeoF-to-NVMe bridge may map the remote hosts to one PF and a set of VFs. From the host point of view, multiple independent NVMe controllers may be exposed to the host. A remote hypervisor may connect to the NVMe controller associated with the PF, while the remote VMs may be mapped and connected to NVMe controllers associated with the VFs. The external NVMeoF-to-NVMe bridge may act as a lightweight implementation of a host and a root-complex to the back-end SSD controller. The external NVMeoF-to-NVMe bridge may implement a SR-IOV protocol to configure and manage the VFs of the back-end SSD controller.

The hypervisor may perform various management and administrative functions for the NVMe controllers assigned to the VMs. The administrative functions may include, but not be limited to: 1) establishing Quality-of-Service policies, 2) providing resource allocation such as bandwidth and capacity, 3) enabling and disabling of the storage functions, and 4) providing overall storage device management. The storage device may support such administrative functions on the PF of the SSD controllers and may use VF NVMe controllers for input/output (I/O) functions. The storage device may implement privacy and isolation between the VF NVMe controllers.

An FPGA may implement a physical layer, a Media Access Controller (MAC), and an embedded network interface controller (eNIC) (sometimes called an embedded network interface circuit) to provide a network communication between VMs and the multi storage function NVMeoF storage device.

The storage device may provide multiple independent channels or connections for NVMeoF communication using existing NVMe controllers that may implement a PF and a large number of VFs. Remote hosts may see n independent NVMeoF storage devices where n is the number of populated VFs in the NVMe controller, even though only a single storage device may be physically present and communicating with the remote hosts. The host hypervisor may set quality of service (QoS) requirements for the VMs. The FPGA may provide isolation and fairness among the VMs.

In some embodiments of the inventive concept, an NVMeoF-to-NVMe bridge, in conjunction with configuration manager and root port (RP) modules, may provide an application-level interface to the NVMe controller: for example, through a PCIe link. The bridge may perform protocol translation needed. The bridge may terminate the NVMeoF protocol between the remote hosts and the FPGA and generate an NVMe protocol between the FPGA and the SSD controller. The FPGA may emulate a lightweight Root Complex and PCIe driver to the back-end NVMe controller. The bridge may generate one or more memory read/write transactions and may map the addresses to VFs before forwarding them to NVMe controller.

In some embodiments of the inventive concept, a configuration manager may deliver required PCIe initialization for different modules in the device. The configuration manager may consist of state machines to initialize the RP and the NVMe controller and may provide status monitoring and performance metrics. The configuration manager may initialize and configure the SR-IOV capability in the SSD controller and may enable usage of the VFs in the SSD controller. For each storage function, an independent admin and multiple I/O submission queues (SQ) may be created and maintained compliant to at least some NVMe Over Fabrics specifications.

In various embodiments of the inventive concept, a given function (either PF or VF) supporting a remote connection from a VM may support a separate namespace. Alternatively, two or more functions may support a shared namespace. Functions on different SSDs may also be able to share a namespace, if the SSDs communicate.

The multi-function device may feature a compact system to implement multiple storage functions with NVMeoF support. Any SSD with SR-IOV support may be used. Each storage device may service multiple remote hosts simultaneously. No special software or driver is required to initialize the VFs. No additional side-band communication among the hosts is required to initialize the storage device. The multi-function device is cost- and energy-efficient, and is scalable.

The storage device may include a network-attached SSD using transport technologies such as Ethernet, Fiber Channel, and/or the like. The NVMeoF protocol may be used as a host interface. An eNIC may be used to perform any network session management related functions. Some examples of such functions are TCP session management, RDMA connection management, combinations thereof, and/or the like.

Using the NVMeoF protocol, one or more host command submission queues may be implemented on the storage device side. Each host may be provided with a set of queues. The NVMeoF-to-NVMe bridge may terminate and translate NVMeoF protocol to NVMe protocol for the back-end SSD controllers. The NVMe commands may be placed into PCIe submission queues (SQs) for the SSD controller to execute. The SSD controller may place NVMe completion entries into the PCIe completion queues (CQs). The SSD controller may access the SQs and CQs, as well as write and read data buffers used in PCIe requests. The SSD controller may implement one or more PFs and a set of VFs. The FPGA may perform SR-IOV management of the VFs. The PF and VFs may have NVMe controllers associated with them. The NVMe controllers may in turn communicate with a Flash Translation Layer (FTL) for data persistence. Flash Channel (FC) modules may perform the flash media management and data persistence.

The storage device may implement NVMeoF protocol to connect to the remote hosts. The storage device may use various network transport protocols including, but not limited to, Ethernet, Fiber-channel, TCP/IP, UDP, RDMA, Infiniband, RDMA, iWARP, and/or the like. The storage device may allow multiple VMs and hypervisors on the remote servers to access the storage device. That is to say, the hypervisors as well as the VMs on the server may have dedicated NVMeoF controllers to write data to and read data from the storage device. The storage device may implement a PCIe-based SSD controller containing PCIe VFs to implement NVMe controllers as needed by the hypervisors and VMs. The hypervisors and VMs may be agnostic to the fact that the storage device may use an NVMeoF-to-NVMe bridging function utilizing a PF and a set of VFs implementing a set of NVMe controllers. While the description below may provide an example description of the storage device using RDMA-based NVMeoF protocol and one host, multiple hosts (e.g., hypervisor and/or VMs) and other network transport technologies may operate in similar manner.

The storage device may thus appear to remote hosts as multiple independent NVMeoF controllers, as shown above, even though the various NVMeoF controllers may be presented using an FPGA and the and the associated NVMe controllers and flash storage may all be in a single SSD. That is, the hypervisor and the VMs may be agnostic to the fact that the storage device implements an NVMeoF-to-NVMe bridge utilizing one PF and a set of VFs implementing a set of NVMe controllers.

In some embodiments of the inventive concept, a NVMeoF storage device may use an RDMA protocol to reliably exchange commands and data between a remote host and an NVMeoF controller. For example, the NVMe commands may be sent using an RDMA SEND service (or a similar service) provided by embedded RDMA Network Interface Card (eRNIC) logic. In an NVMeoF based RDAS architecture, the command SQs may be implemented on the storage device (SSD) side. As a command capsule or packet is received at eRNIC, the eRNIC may forward the command capsule or packet to the NVMeoF controller along with the Queue Pair (QP) number it was received on. The received commands may be stored in the SQs of the corresponding host. The QPs may have a 1:1 mapping with fabric-side submission queues. A first level mapping may be to map the active hosts with associated fabric-side submission queues. Then one of the SQs of the selected host may be selected for execution of the command. A command may be taken out of the selected queue for further processing.

The command capsule may be parsed to check the type of the command. There may be at least one and up to five types of NVMeoF commands: Fabrics, Admin, Write, Read, and Special. The processing of these commands by the FPGA and/or NVMe storage device may differ. For every command selected for execution, a fabric command context may be created. The fabric command context may track the parameters, such as submission queue (i.e., QP number, which may identify the submission queue), command ID, etc., that may be specific to that command. The command may also be assigned a tag, that may be used to access this context during the entire life span of that command. The tag may be a simple index into context RAM or it may be a unique value that may be looked up further. This FTag may be recorded in a command context for the life of that command during execution.

The NVMeoF commands may be categorized using at least one and up to three different categories: 1) Fabrics commands, 2) Admin commands, and 3) I/O commands. The Fabrics type of commands may involve reading and/or writing SSD NVMe controller registers that advertise various features and capabilities to the remote host. Some of the advanced Fabrics commands may involve firmware support for implementation: for example, authentication and security related commands. The Admin commands may perform SSD NVMe controller register read/write operations as well as data buffer transfers.

In one embodiment of the inventive concept, the NVMeoF Write I/O commands may first be broken into sub-commands with suitable data transfer lengths. For each of the Write sub-commands, write data may be fetched from the remote host using RDMA READ service to the local write data buffer (WDB). Once the write data is fetched, an NVMe Write command may be submitted to the NVMe controller inside the SSD controller. This procedure may be repeated until the whole NVMeoF Write command is finished. The number of NVMe Write sub-commands used may be maintained in the command context of the FPGA. As the NVMe Write sub-commands are completed by the NVMe storage device, the command context of the FPGA may be updated. Once all the Write sub-commands are completed successfully, the FPGA may generate an NVMeoF completion entry for the remote host. The FPGA may then transfer this completion entry to a host CQ using an RDMA-SEND operation.

In another embodiment of the inventive concept, the whole write data corresponding to the NVMeoF Write command may be fetched and then a single NVMe Write command may be issued to the NVMe controller inside the SSD controller.

The NVMeoF Read commands may have a similar flow to the NVMeoF Write commands. In one embodiment of the inventive concept, the Read command may be broken into suitably-sized NVMe Read sub-commands. The number of such Read sub-commands may be maintained in the command context of the FPGA. When the SSD controller deposits the read data into the local read buffer (RDB), the NVMe controller inside the SSD controller may place an NVMe completion entry for that sub-command in the completion queue of the FPGA for the appropriate VF. Once a Read sub-command is completed, that chunk of read data may be transferred to the remote host using RDMA WRITE service. Once all the NVMe Read sub-commands are completed successfully and all the read data has been transferred to the remote host, the NVMeoF Read command may be ready for completion. The command context of the FPGA may be used to create an NVMeoF completion entry which may be placed into the appropriate CQ located in the remote host memory.

In another embodiment of the inventive concept, the NVMeoF Read command is executed as a single NVMe Read command and not further divided into the sub-commands as described in the earlier embodiment of the inventive concept.

Various data structures may be used to track the execution of the NVMeoF commands as well as the bridged NVMe commands and maintain coherency while these commands are processed. For example, tables or other data structures may be used to track the status of individual commands, the queue pair to which individual commands were submitted, tags (if any) associated with the individual commands, which commands submitted to an NVMe controller inside the SSD controller, and so on.

Since multiple remote hosts may be active at any given time, multiple concurrent NVMeoF as well as NVMe commands may be executed in parallel.

The hypervisor on the remote host may send administrative commands: for example, to set QoS requirements and/or resource allocation parameters for VM hosts. The hypervisor may be mapped to the PF NVMe controller inside the SSD controller. The VM hosts may be mapped to the VF NVMe controllers inside the SSD controller. The QoS and resource allocation parameters sent from the hypervisor may be forwarded to the PF NVMe controller inside the SSD controller, which may act as the administrative NVMe controller.

Embedded Multi Connection/Multi Host NIC

The eNIC may implement network protocols and physical and data link layers for networking communications between the network attached SSD and multiple hosts. The eNIC may also provide a control communication channel between the SSD and the hypervisor and VMs.

Various wired, optical, or wireless network topologies may be leveraged to create the links to the remote hosts. The NVMeoF transport layer may be implemented independently on top of the network layer. The transport layer may encapsulate NVMe commands, responses, and data transfers, according to NVMeoF specifications. Similar to the network layer, different flavors of NVMeoF transport layers such as RDMA, Transmission Control Protocol (TCP) RDMA over Converged Ethernet (RoCE); RDMA over Converged Ethernet V2; RDMA on InfiniBand Network Connections; Internet Wide Area RDMA Protocol (iWARP); SCSI RDMA Protocol; NVMe over TCP; and NVMe over Fiber Channel may be implemented, among others.

The network protocols may support both control path and data path functions. The control path functions may be used for various control functions such as discovery, identification, configuration, connection establishments, and other such network connection management functions. The data path functions may include transfer of data messages in either direction, flow control, error detection and recovery, etc.

The NVMeoF protocol may use the network protocols as transport mechanism to send NVMe commands to the storage device and transfer data between the host and the device. A single host may use a set of network connections (that is, one or more network connections) for this purpose. Thus the storage device may support multiple sets of connections, one set per remote host.

The storage device may establish simultaneous connections to multiple hosts and perform NVMeoF communication with each host independently. After one or more connections are established, based on the network topology and the transport layer, a look up table containing the host IDs, such as a Content Addressable Memory (CAM) table, may be used to determine and differentiate the channel index and to forward the control or data packets to an appropriate channel-based interface.

NVMeoF Command Queuing

The storage device may implement a queueing mechanism to buffer and arbitrate NVMeoF commands, responses, and data from several hosts.

Each host may encapsulate submission queue entries (SQE) and optional data, or a scatter gather list (SGL), into NVMeoF command capsules, which may be sent to the storage device. In the FPGA, command capsules may be first extracted from fabric packets and stored in the channel based NVMeoF command queues. If a command capsule includes data or an SGL, the data may be fetched and stored in the WDB.

Each channel-based command queue may store command capsules from a specific host and may be independent of the other queues. An SQE's Command Identifier field may be unique among the commands inside each channel-based queue. A selection scheme may be implemented to select a command entry from a queue and transferred to NVMeoF-to-NVMe bridge. If the hypervisor does not specify a QoS policy for how to select the next command entry, round-robin selection from among the available queues may be performed to select the next command.

A similar set of queues may be implemented for response capsules containing completion queue entry (CQE) and optional data received form NVMeoF-to-NVMe bridge. One channel may be selected from among those with responses pending, a response entry may be selected, and a response may be generated based on the selected response entry and sent to the eNIC module. If a CQE specifies a data block or an SGL, the data may be fetched from the RDB and transferred to the eNIC.

The hypervisor may define QoS guidelines and a size for each queue. The queue sizes may be the same or different for each channel. Depending on the queue sizes, allocation of the memory may be implemented in the FPGA, on-board DRAM memory or both.

Data Buffers

Data Buffers may be physical on-chip memory storage or an off-chip DDR region dedicated for in-flight data staging purpose. Data buffers may be protected using error correcting codes (ECCs) if desired. Each VM may have a different memory allocation type (on-chip or off-chip): which memory allocation type is to be used for a given VM may be determined based on a latency requirement of the VM. There are two parts: the WDB and the RDB.

Write Data Buffer (WDB):

Ingress data received from the host at the FPGA may be stored in the WDB temporary until it is ready to forward to the SSD. Typically, for a particular queue, when a max transfer unit (MTU) is reached or all data of a transaction has been received from the host, the NVMeoF-to-NVMe bridge may generate an NVMe transaction to the SSD. The data in the WDB may be fetched and move to the SSD accordingly. In some embodiments of the inventive concept, the WDB may be a common memory: that is, a pool of buffers shared among all SQs and hosts. In other embodiments of the inventive concept, the WDB may be dedicated memory space for each individual host. Memory space allocation for each host may be determined by a QoS setting set by the hypervisor.

Read Data Buffer (RDB):

Egress data from the SSD to the host may be stored in the RDB temporary until it is ready to transmit to the host. Typically, for a particular queue, when an MTU is reached or all data of a transaction has been received from SSD, the NVMeoF-to-NVMe bridge may generate an RDMA transaction and move the data to the host accordingly. In some embodiments of the inventive concept, the RDB is a common memory: that is, a pool of buffers shared among all SQs and hosts. In other embodiments of the inventive concept, the RDB may be dedicated memory space for each individual host. Memory space allocation for each host may be determined by a QoS setting set by the hypervisor.

NVMeoF-to-NVMe Bridging

In embodiments of the inventive concept, multiple VMs on a remote server may use the NVMeoF protocol to access the storage device. The FPGA may internally bridge the NVMeoF protocol to NVMe protocol supported by the NVMe SSD controller. That is to say, the external logic may terminate the NVMeoF protocol from the remote hosts and may generate an NVMe protocol for the NVMe controller inside the SSD controller. There are some protocol differences between NVMeoF and NVMe protocols, so the bridging functionality may perform translations between the protocols. Some example differences that may be handled by the NVMeoF-to-NVMe bridge are listed below: Create and Delete I/O SQ commands in NVMe, as compared with Connect commands in NVMeoF; differences in the Identify data structure; some commands, such as Connect and Keep Alive, which may only be present or useful in NVMeoF; Memory model differences using Keyed SGL; NVMe register accesses may differ; and NVMeoF may have authentication commands not present in NVMe.

When remote hosts send NVMeoF commands to the storage device, equivalent actions and commands may be taken with respect to the NVMe controller inside the SSD controller. In other words, the bridging logic may make the presence of the NVMe controllers inside the SSD controller transparent to the remote hosts. At the same time, such bridging functions may make the presence of the remote hosts transparent to the NVMe controllers present in the SSD controller.

The bridging function may create equal number of command submission queues in the NVMe domain for the remote hosts. The bridging function may fetch the NVMeoF Write command data into the WDB and then issue NVMe Write commands to the appropriate VF and NVMe controller. Similarly, for the NVMeoF Read commands, the bridging functions may first fetch the data into the RDB and then return that data to the remote hosts. The data read and write operations between remote NVMeoF hosts and NVMe controllers inside the SSD controller may be performed in cut-through and/or store-forward fashion.

At any given time, multiple NVMeoF commands of multiple remote hosts may be active or being executed. The bridging functionality may track these commands using unique tags and make sure appropriate privacy, security, and QoS polices are applied during the command execution.

NVMe Host Emulation

The NVMeoF-to-NVMe bridge may essentially act as a lightweight host to the NVMe SSD controller, which may be a standard NVMe SSD controller that uses PCIe as a transport link. The bridge may implement a lightweight PCIe root complex and NVMe host interface to the SSD controller. The PCIe root complex may perform PCIe bus enumeration and PCIe configuration of the PCIe end point present in the SSD controller. The bridge may set appropriate PCIe capabilities and features. A configuration manager in the FPGA may perform all the discovery and configurations functions. The configuration manager may also configure PCIe SR-IOV capability to enable desired number of VFs, and configure the VFs.

The NVMeoF-to-NVMe bridge may send commands to the SSD controller through an NVMe-defined command queueing mechanism. The command processing modules of the NVMeoF-to-NVMe bridge may create commands and provide those SQEs to a PCIe submission queue (PSQ) module along with SQ identifier (such as a QP number). The PSQ module may manage the command requestors to determine which command requestor is to be processed next, and may place the commands at appropriate queue locations. The PSQ module may maintain the data structures necessary for such command queueing. For each SQ, there may exist a head pointer and a tail pointer. The SQ tail pointer may be maintained by the PSQ module to add new SQEs to the SQ. The SQ head pointer may be maintained by the SSD controller to read the next SQE from that SQ. When a submission queue has some number of commands pending, an NVMe-defined doorbell mechanism may be used to provide a trigger to the back-end SSD controller. This trigger is called as doorbell, which may be a PCIe Memory Write operation to update the submission queue tail pointer in the SSD controller. The PSQ module may perform flow control for the submission queues. The PSQ module may maintain queue full and empty status for all the submission queues. The SSD controller may periodically send the SQ head pointer values to the PSQ module for SQ-level flow control through completion entries (CE). The storage device may implement a set of PSQs to match with a number of PF and VFs enabled on the SSD controller. In other words, the number of PSQ sets may be matched with the number of remote hosts supported according to a 1:1 mapping.

The PCIe completion queue (PCQ) module may implement the command completion queues. When the SSD controller completes data transfers for a command, the PCQ module may post a CE for that command. The CE may be placed in the CQ corresponding to the SQ to which the command belongs. For each CQ there may be a head pointer and a tail pointer for flow control purposes. The tail pointer may be maintained by the SSD controller to write new CEs. The head pointer may be maintained by the PCQ module to read the posted CEs. The received CEs may be removed from the CQ and then parsed to extract command and status information. The parsed CEs also may provide SQ flow control mechanism in the form of a SQ head pointer. The extracted SQ head pointer may be sent over to the appropriate PSQ module. Finally the CQs may use a CQ head door-bell mechanism. When the CEs are removed from the CQs, updated CQ head pointers may be sent to the SSD controller in the form of CQ door-bells. The method may implements a set of PCQs to match with a number of PF and VFs enabled on the SSD controller. In other words the number of PCQ sets may be matched with the number of remote hosts supported according to a 1:1 mapping.

Quality of Service

The QoS defines a set of profiles, policies, and guidelines that may be used to prioritize resource allocation and to limit the traffic of individual VMs accessing the NVMeoF storage device. The host hypervisor may be responsible for assigning QoS policies and communicating with the storage device. The FPGA, on the other hand, may provide isolation and fairness among all VMs based on the defined QoS profiles and may guarantee the entire bandwidth is not consumed by a single channel or a group of channels. The FPGA may also measure important information such as bandwidth and buffer levels and provide this information to the hypervisor for monitoring and fine-tuning of the policies.

QoS profiling may include but is not limited to strict priority arbitration, round-robin arbitration, weighted round-round arbitration or time division multiple access (TDMA). If the policies are not defined by the hypervisor, the FPGA may conduct unbiased traffic scheduling mechanisms, such as round-robin scheduling. QoS policies may be defined and implemented in different design components as described throughout this document. Examples of such implementations may be accomplished in the eNIC, NVMeoF command queuing, NVMeoF-to-NVMe bridge, or root complex modules. The policies may be also forwarded to the NVMe controller associated with the PF performing as an administrative module.

Since each network connection may be managed per VM, the privacy of each channel may be maintained in the FPGA. The SR-IOV device may also be aware of each physical host connecting to individual VFs. Thus, it is possible to implement security measures in the system and method. Privacy and multi-tenancy policies from hypervisor may be received by the FPGA and then forwarded to NVMe controller associated with the PF.

The FPGA may provide an independent link and may expose a list of registers to the hypervisor for setting network information for the VMs, specifying QoS and privacy policies and monitoring statuses, errors and other performance measurements.

PCIe Root Complex

This system and method may implement a lightweight PCIe root complex interfacing with the back-end SSD controller. The external logic, such as the FPGA, may emulate an NVMe host to the SSD controller and may implement the NVMeoF-to-NVMe bridge functionality.

The root complex may provide required PCIe enumeration, initialization, and configuration of the PCIe end point (EP) of the SSD controller. The root complex may generate PCIe configuration transactions to the EP to configure the PCIe configuration space and various capabilities. The root complex may generate as well as receive and analyze PCIe memory space transaction requests and completions issued by the SSD controller. The root complex may then forward the memory read and write transactions generated by the SSD controller to the NVMeoF-to-NVMe bridge.

The configuration manager may perform PCIe bus enumeration for the SSD controller EP. The configuration manager may initialize and configure the EP in the SSD controller. The configuration manager may set up various PCIe capabilities including but not limited to Command, base address register (BARs), PCIe, SR-IOV, ARI, Device Control, Link Control, Power Management, and interrupts in the SSD controller. The configuration manager may enable the SR-IOV and configure multiple VFs in the controller. When all the configurations are complete, the configuration manager may enable the PCIe transactions.

The PCIe standard may provide an SR-IOV specification which may enable sharing of a single physical function among multiple VMs. SR-IOV may be used in such environments to facilitate multiple NVMe controllers in a single PCIe SSD device. However, the SR-IOV functionality may lead to complexity and performance overheads among VMs. For this reason, it may be desirable to have PF-based NVMe controllers that may be assigned to independent channels in the NVMeoF-to-NVMe bridge. The root complex in this architecture may manage VFs and may provide VF-to-PF translation before forwarding the requests to the NVMeoF-to-NVMe bridge. Any requests from VMs to access their dedicated physical storage devices may similarly be translated and mapped to an appropriate VF and then forwarded to SSD controller through the PCIe link.

The root complex may be responsible for creating, removing, configuration, and management of VFs. The root complex may control the PFs and VFs, process all events such as errors, monitor all statuses, maintain QoS, and reset the functions when necessary. The overall status and settings such as QoS management may be available for the hypervisor in order to monitor or modify if required.

FIG. 1 shows a machine including a multiple function storage device equipped to support multiple hosts, according to embodiments of the inventive concept. In FIG. 1, machine 105 is shown. Machine 105 may include processor 110. Processor 110 may be any variety of processor. (Processor 110, along with the other components discussed below, are shown outside machine 105 for ease of illustration: embodiments of the inventive concept may include these components within machine 105.) While FIG. 1 shows a single processor 110 in machine 105, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used to manage access to memory 115.

Machine 105 may also include a storage device. Multiple function storage device 125 may be used to store data. Processor 110 may run device driver 130, which may support access to multiple function storage device 125. While embodiments of the inventive concept may focus on a Solid State Drive (SSD) as part of multiple function storage device 125, any desired storage device may be used, which may operate using any desired storage principle. Thus, multiple function storage device 125 may include a block-based SSD, a Key-Value SSD (KV-SSD), a hard disk drive, or any other desired storage device. While FIG. 1 shows only one multiple function storage device 125, embodiments of the inventive concept may support any number of installed storage devices in machine 105, which may differ from each other (or be similar or identical to each other) with respect to any specific individual elements.

A Key-Value storage device may use keys to identify data rather than a logical block address (LBA). Unlike block-based storage, where data is expected to be written and read in units of a specific pre-defined size (for example, a page or a block), objects may conceivably be of any size. The size of an object stored on a Key-Value storage device may be bounded by the capacity of the Key-Value storage device. Thus, the size of an object may be smaller than a page or a block, or the size of an object may be larger than a page or a block. (While the size of a page or a block may still control how the object is stored, how storage is managed is separate from how objects may be written or read.)

Similarly, while block-based storage may expect an LBA to fit into a specific range of values (and therefore to use a specific pre-defined number of bits in an LBA), the key may conceivably be of any size, and may take on any desired value. Because the number of bits in the key may vary, Key-Value storage devices may be more flexible than block-based storage devices. But there are other considerations as well. For example, while LBAs as used by different applications may be unique, nothing prevents different applications from attempting to use the same key to write data. In such situations, the Key-Value storage device may return an error to the second application, informing that application that the key is already in use and so the value could not be written to the Key-Value storage device.

Machine 105 is shown connected to network 135. Network 135 may be any variety of network, such as a Local Area Network (LAN), a Wide Area Network (WAN), a Metropolitan Area Network (MAN), a global network (such as the Internet), or any combination thereof. In addition, network 135 may include connections of any type, including wired and wireless connections (or combinations thereof). Network 135 may have other devices connected to it (as discussed below with reference to FIG. 3).

In addition, FIG. 1 shows multiple function storage device 125 connected to network 135. By having a direct connection to network 135, multiple function storage device 125 may bypass the internal elements of machine 105. Such an arrangement may result in faster communication with multiple function storage device 125 from remote hosts. In addition, with sufficient intelligence built into multiple function storage device 125 (as discussed below), components such as processor 110, memory 115, and memory controller 120, may be reduced in terms of the functionality required or may be eliminated entirely. Embodiments of the inventive concept are intended to cover all such variations, where machine 105 includes processor 110, memory 115, and memory controller 120, or omits those components.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, an application that may be accessing data from multiple function storage device 125 may located in another machine, separate from machine 105 and accessing machine 105 via a network connection traversing one or more networks of any types (wired, wireless, global, etc.). Machine 105 may be a conventional server, such as might support virtual machines (as discussed below with reference to FIG. 3), or machine 105 may be a storage server (which may omit processor 110, memory 115, memory controller 120, and/or device driver 130).

Figure 2:
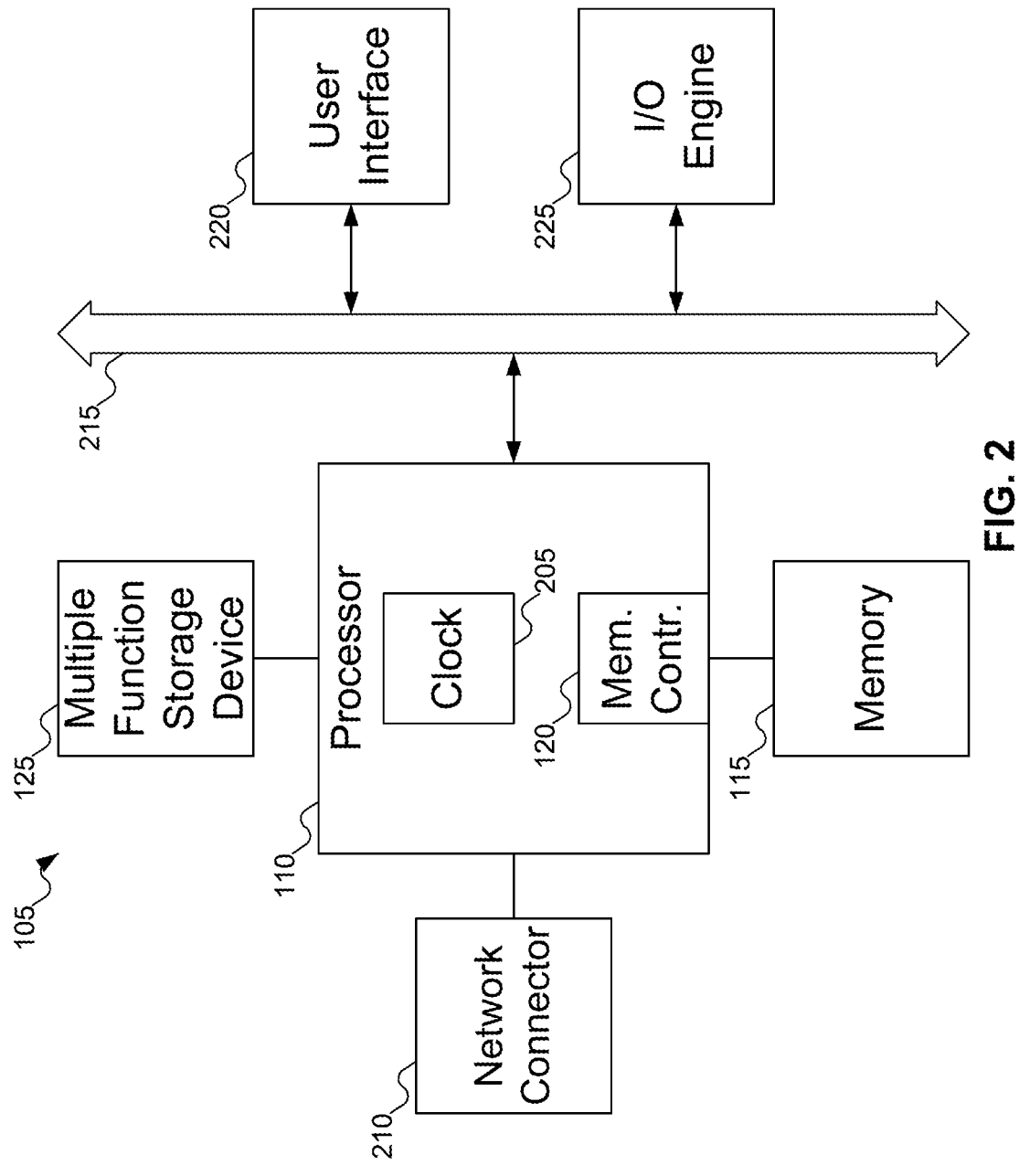
FIG. 2 shows additional details of the machine of FIG. 1, according to embodiments of the inventive concept.

FIG. 2 shows additional details of the machine of FIG. 1, according to embodiments of the inventive concept. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to multiple function storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
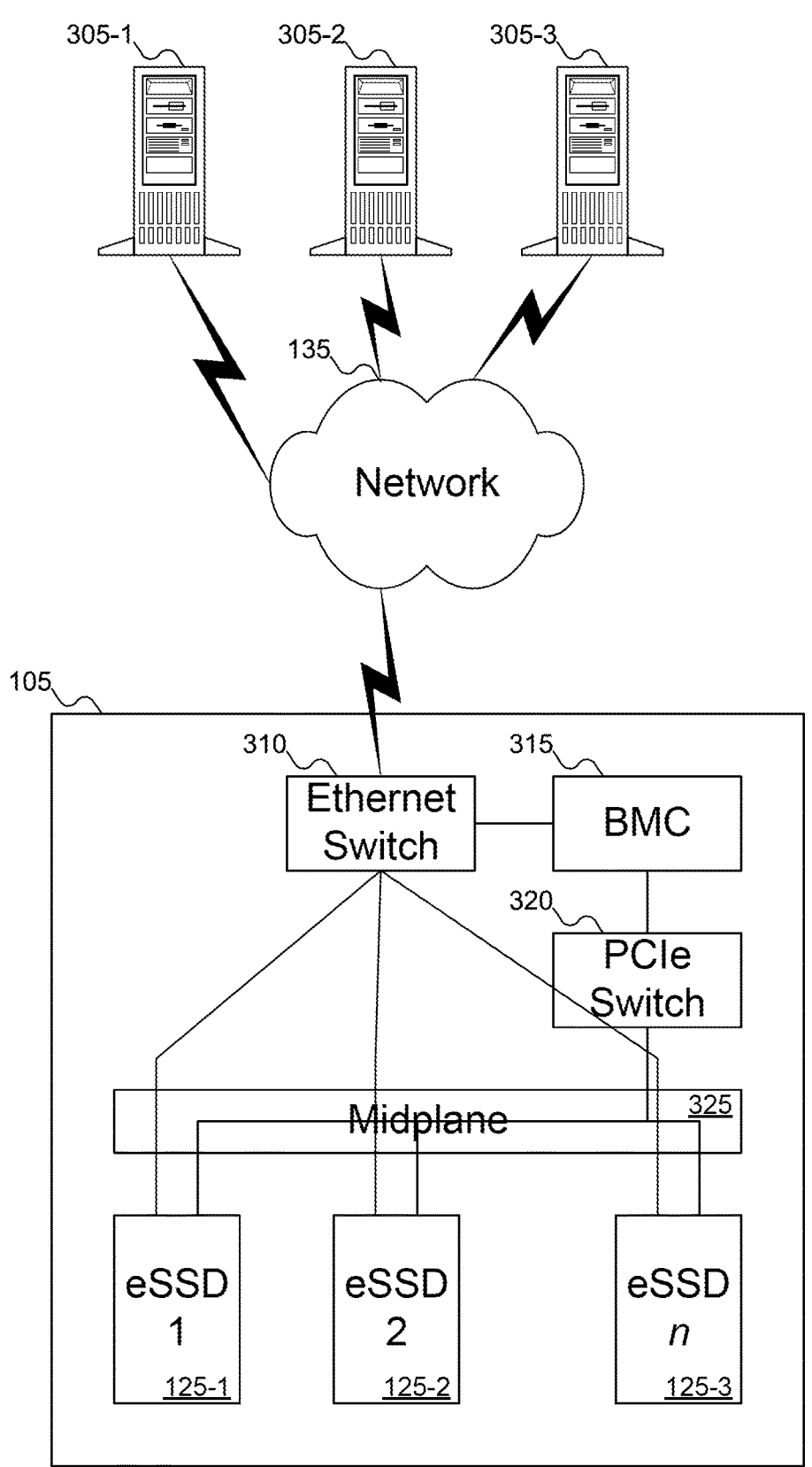
FIG. 3 shows remote hosts communicating with the machine of FIG. 1, according to embodiments of the inventive concept.

FIG. 3 shows remote hosts communicating with the machine of FIG. 1, according to embodiments of the inventive concept. In FIG. 3, remote hosts 305-1, 305-2, and 305-3 are shown. While FIG. 3 shows three remote hosts, embodiments of the inventive concept may include any number (zero or more) remote hosts connecting to network 135 at any given time. In addition, as discussed further below with reference to FIGS. 4A-4B, a remote host may be a standalone computer system, or it may be a virtual machine (VM) running on a computer system and managed by a hypervisor (which itself may also be considered a remote host).

Remote hosts 305-1, 305-2, and 305-3 may connect to network 135, which in turn may connect to machine 105. More particularly, ethernet switch 310 may connect machine 105 to network 135. Ethernet SSDs (eSSDs) 125-1, 125-2, and 125-3 may connect to ethernet switch 310, thereby enabling a connection between eSSDs 125-1, 125-2, and 125-3 to network 135 (and to remote hosts 305-1, 305-2, and 305-3). While FIG. 3 shows three eSSDs 125-1, 125-2, and 125-3, embodiments of the inventive concept may include any number of eSSDs (one or more). Further, eSSDs 125-1, 125-2, and 125-3 may be replaced with other network-capable storage devices without loss of generality.

In addition to ethernet switch 310 and eSSDs 125-1, 125-2, and 125-3, machine 105 may also include Baseboard Management Controller (BMC) 315, Peripheral Component Interconnect Express (PCIe) switch 320, and midplane 325. BMC 315 may be connected to ethernet switch 310, and in turn may be connected to PCIe switch 320. Across midplane 325, PCIe switch 320 may be connected with eSSDs 125-1, 125-2, and 125-3, using a separate communication path than that used to connect eSSDs 125-1, 125-2, and 125-3 to ethernet switch 310. In practical terms, the existence of two connections offers some alternatives for different embodiments of the inventive concept. In some embodiments of the inventive concept, the direct communication path from ethernet switch 310 to eSSDs 125-1, 125-2, and 125-3 may be used as a data path, and the communication path from ethernet switch 310 to eSSDs 125-1, 125-2, and 125-3 through BMC 315, PCIe switch 320, and midplane 325 may be used as a control path (that is, the communication path through BMC 315 may be used to send information relating to the management of eSSDs 125-1, 125-2, and 125-3, rather than requests for data to be written to or read from eSSDs 125-1, 125-2, and 125-3). In other embodiments of the inventive concept, the communication path from ethernet switch 310 to eSSDs 125-1, 125-2, and 125-3 through BMC 315, PCIe switch 320, and midplane 325 may be used as a backup in case the direct communication path from ethernet switch 310 to eSSDs 125-1, 125-2, and 125-3 fails for some reason. In yet other embodiments of the inventive concept, both communication paths may be used in parallel for any reason, thereby potentially expediting communication between remote hosts 305-1, 305-2, and 305-3 and eSSDs 125-1, 125-2, and 125-3.

Figure 4A:
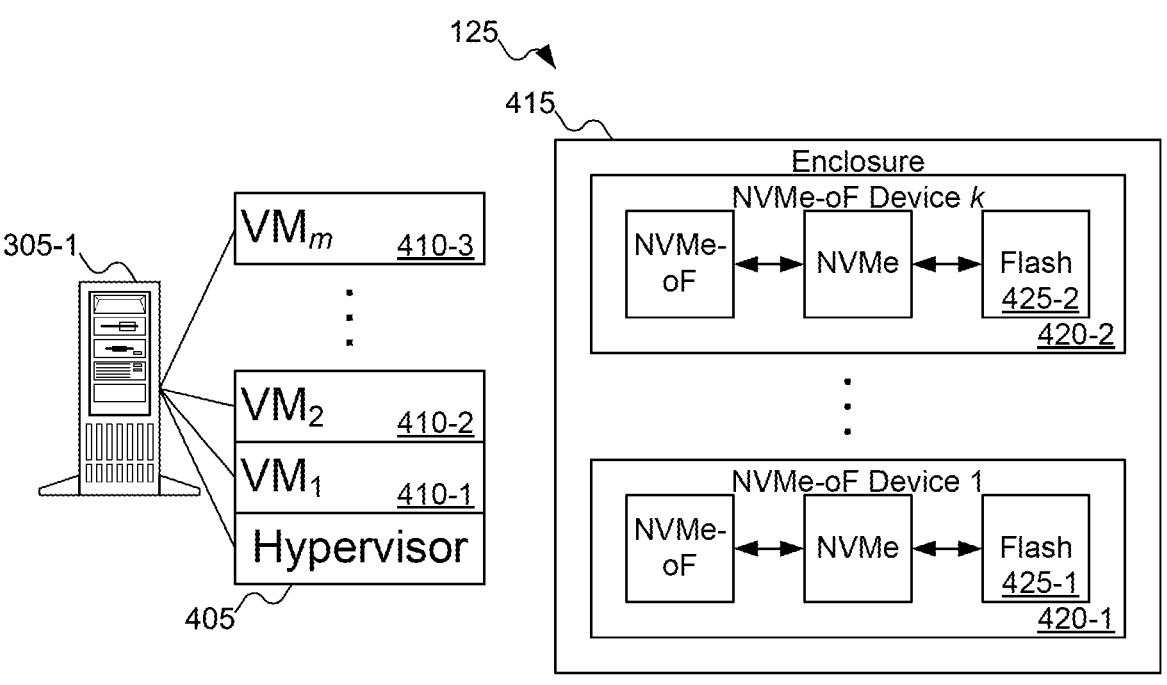
FIGS. 4A-4B compare how the remote hosts of FIG. 3 see the multiple function storage device of FIG. 1 with how the multiple function storage device of FIG. 1 is actually implemented, according to embodiments of the inventive concept.
Figure 4B:
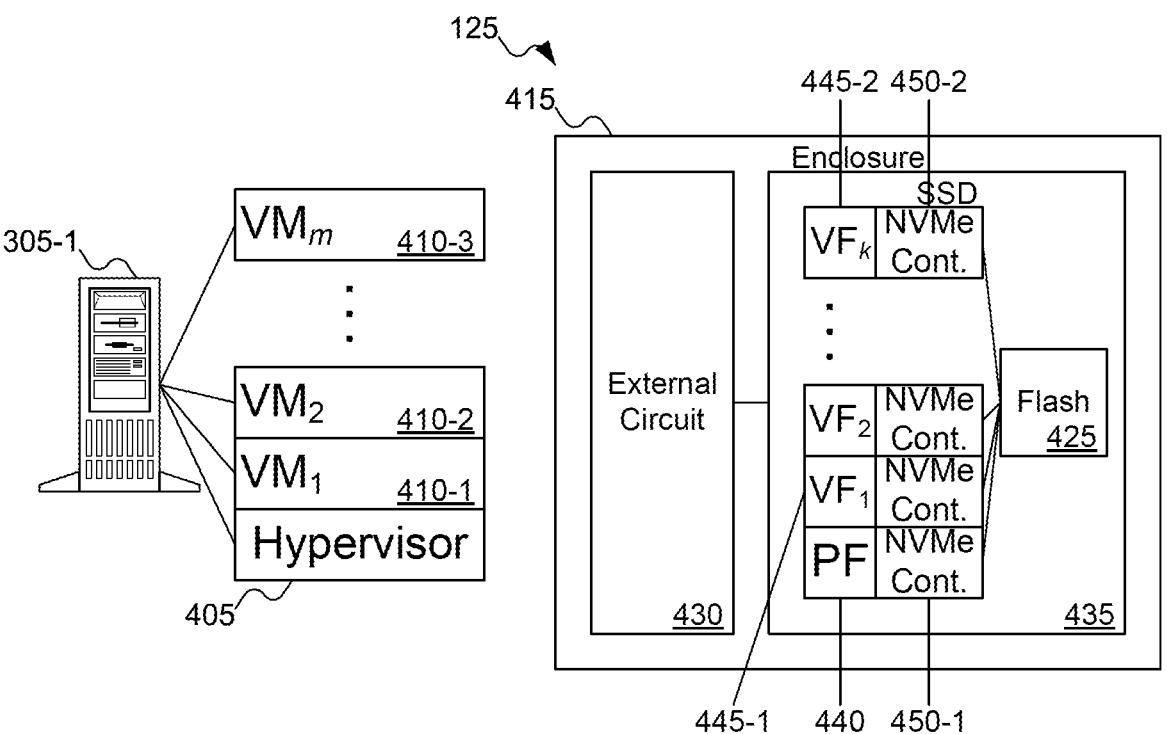

FIGS. 4A-4B compare how remote host 305-1 of FIG. 3 sees multiple function storage device 125 of FIG. 1 with how multiple function storage device 125 of FIG. 1 actually appears, according to embodiments of the inventive concept. In FIG. 4A, remote host 305-1 is shown as including hypervisor 405 and VMs 410-1, 410-2, and 410-3. While FIG. 4A shows remote host 305-1 as including three VMs, embodiments of the inventive may support remote hosts with any number of VMs, and different remote hosts with different numbers of VMs. In addition, remote host 305-1 may support multiple hypervisors, each managing a subset of the VMs running on remote host 305-1.

From the perspective of remote host 305-1 (and more particularly, from the perspective of hypervisor 405 and VMs 410-1, 410-2, and 410-3), multiple function storage device 125, which may include enclosure 415 and components inside, looks like it includes Non-Volatile Memory Express Over Fabrics (NVMeoF) SSDs 420-1 and 420-2. While FIG. 4A appears to present only two NVMeoF SSDs 420-1 and 420-2, enclosure 415 may appear to include any number (one or more) of NVMeoF SSDs (the exact number may vary depending on the number of physical functions (PFs) and virtual functions (VFs) exposed by storage devices inside enclosure 415 and the number of those functions that have been enabled or disabled). Typically, the number of NVMeoF SSDs that remote host 305-1 "sees" is at least as large as the number of actual SSDs installed inside enclosure 415 (typically, several times larger). Each NVMeoF SSD appears to be an SSD including flash (such as flash 425-1 and 425-2), with front-ends that present NVMeoF interfaces to remote host 305-1.

Since remote host 305-1 "sees" a number of separate NVMeoF SSDs, remote host may connect to any available NVMeoF SSD without worry that the connection might affect any other remote host connecting to one of the other NVMeoF SSDs.

In contrast to what remote host 305-1 "sees", the actual implementation inside enclosure 415 is different, as shown in FIG. 4B. In FIG. 4B, enclosure 415 may include bridging device 430. The implementation of bridging device 430 is discussed further below with reference to FIG. 6. Bridging device 430 may interface with Non-Volatile Memory Express (NVMe) SSD 435. NVMe SSD 435 may expose PF 440 and VFs 445-1 and 445-2. For each exposed function (physical or virtual), NVMe SSD 435 may include an NVMe controller, such as NVMe controllers 450-1 and 450-2, each of which may interface with flash 425. NVMe SSD 435 may implement Single Root Input/Output Virtualization (SR-IOV) to support multiple remote hosts communicating with NVMe SSD 435.

The term "external" in "bridging device" should be understood to mean that the circuit in question is "external" to the storage device itself. In such embodiments of the inventive concept, the storage device itself may avoid being modified, and theoretically any storage device that is otherwise serviceable may be used with bridging device 430. But bridging device 430 does not have to be "external" to everything, or even necessarily noticeably separate from storage device 435. For example, bridging device 430 and storage device 435 may both be inside enclosure 415, and therefore not separately visible to a customer. But in some embodiments of the inventive concept, it may be possible for bridging device 430 to be distributed from NVMe SSD 435. Put another way, bridging device 430 and NVMe SSD 435 may not both be inside enclosure 415, and may be considered remotely located from each other, with communications between the two travelling across some sort of connection (which might or might not include network 135 of FIG. 1). But there may still be an association between bridging device 430 and NVMe SSD 435, so that bridging device 430 may operate to make NVMe SSD 435 look like multiple NVMeoF SSDs.

While FIG. 4B shows one PF 440 and three VFs 450-1 and 450-2, embodiments of the inventive concept may support any number (one or more) of PFs and any number (one or more) of VFs. Typically, each PF may include its own hardware resources, which may be shared by a subset of the VFs. While FIG. 4B shows enclosure 415 including one NVMe SSD 435, embodiments of the inventive concept may include any number (one or more) storage devices within enclosure 415. Finally, embodiments of the inventive concept may extend to storage devices using other protocols for communication (that is, other than NVMe), or that may use other storage technologies (such as hard disk drives).

NVMe controllers 450-1 through 450-2 may be implemented using hardware (such as a processor, a Field Programmable Gate Array (FPGA), an Application-Specific Integrated Circuit (ASIC), a Graphics Processing Unit (GPU), or a general purpose GPU (GPGPU), to name a few possible implementations), software (which may run on appropriately available hardware), or a combination of the two.

In some embodiments of the inventive concept, each function exposed by NVMe SSD 435 may communicate with at most one remote host 305-1 at a time. (Note that this relationship is not necessarily one-to-one from the point of view of remote host 305-1: remote host 305-1 may communicate with multiple functions exposed by NVMe SSD 435, or by functions exposed by other storage devices.) In other embodiments of the inventive concept, bridging device 430 may enable multiple remote hosts 305-1 to communicate with a single function exposed by NVMe SSD 435 contemporaneously (which may be understood to mean that bridging device 430 may communicate with multiple remote hosts 305-1 at around the same time, and possibly at the same time, but different communications may be in different states, and at any moment in time bridging device 430 may be communicating with zero, one, or more than one remote hosts 305-1). But permitting multiple remote hosts 305-1 to communicate with a single function exposed by NVMe SSD 435 at the same time does entail some potential risk that one host's data may not be kept secure from another host. In such embodiments of the inventive concept, bridging device 430 may subdivide the address space of the function exposed by NVMe SSD 430 in a manner that keeps data isolated between or among hosts. (This is similar to how bridging device 430 may enforce isolation among hosts, as discussed below.)

It is also possible for different functions exposed by NVMe SSD 435 to share a namespace. By sharing a namespace, it may be possible for two (or more) remote hosts 305-1 (or hypervisor 405 or VMs 410-1, 410-2, or 410-3) to share information. These different functions may be exposed by a single NVMe SSD 435 or my multiple NVMe SSDs 435 (which may involve communication between the multiple NVMe SSDs 435).

Figure 5A:
FIGS. 5A-5C show the remote hosts of FIG. 4B connecting to the multiple function storage device of FIG. 1, according to embodiments of the inventive concept.
Figure 5B:
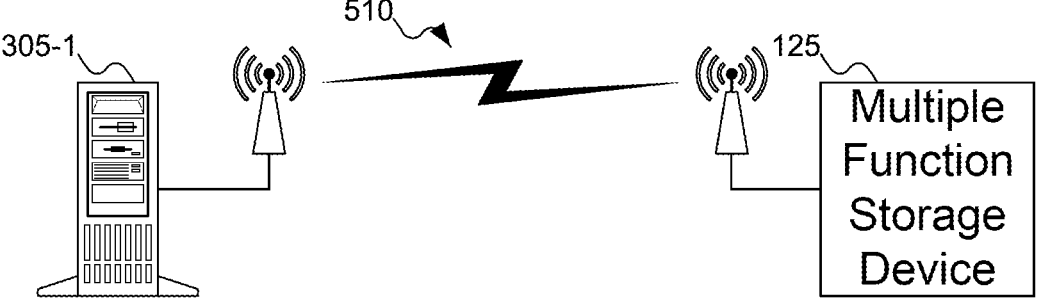
Figure 5C:
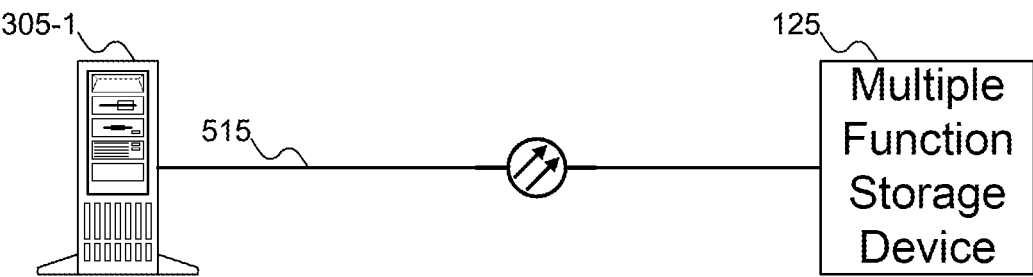

FIGS. 5A-5C show remote host 305-1 of FIG. 4B connecting to multiple function storage device 125 of FIG. 1, according to embodiments of the inventive concept. In FIG. 5A, remote host 305-1 may communicate with multiple function storage device 125 over wired connection 505. (While FIGS. 5A-5C show remote host 305-1 rather than VM 410-1 or 410-2 of FIG. 4, embodiments of the inventive concept may include VMs 410-1 or 410-2 of FIG. 4B be running on remote host 305-1, and therefore figuratively may be the "remote host" that is connected to multiple function storage device 125.) In FIG. 5B, remote host 305-1 may communicate with multiple function storage device 125 over wireless connection 510. In FIG. 5C, remote host 305-1 may communicate with multiple function storage device 125 over optical connection 515. Other types of connections are also possible.

Figure 6:
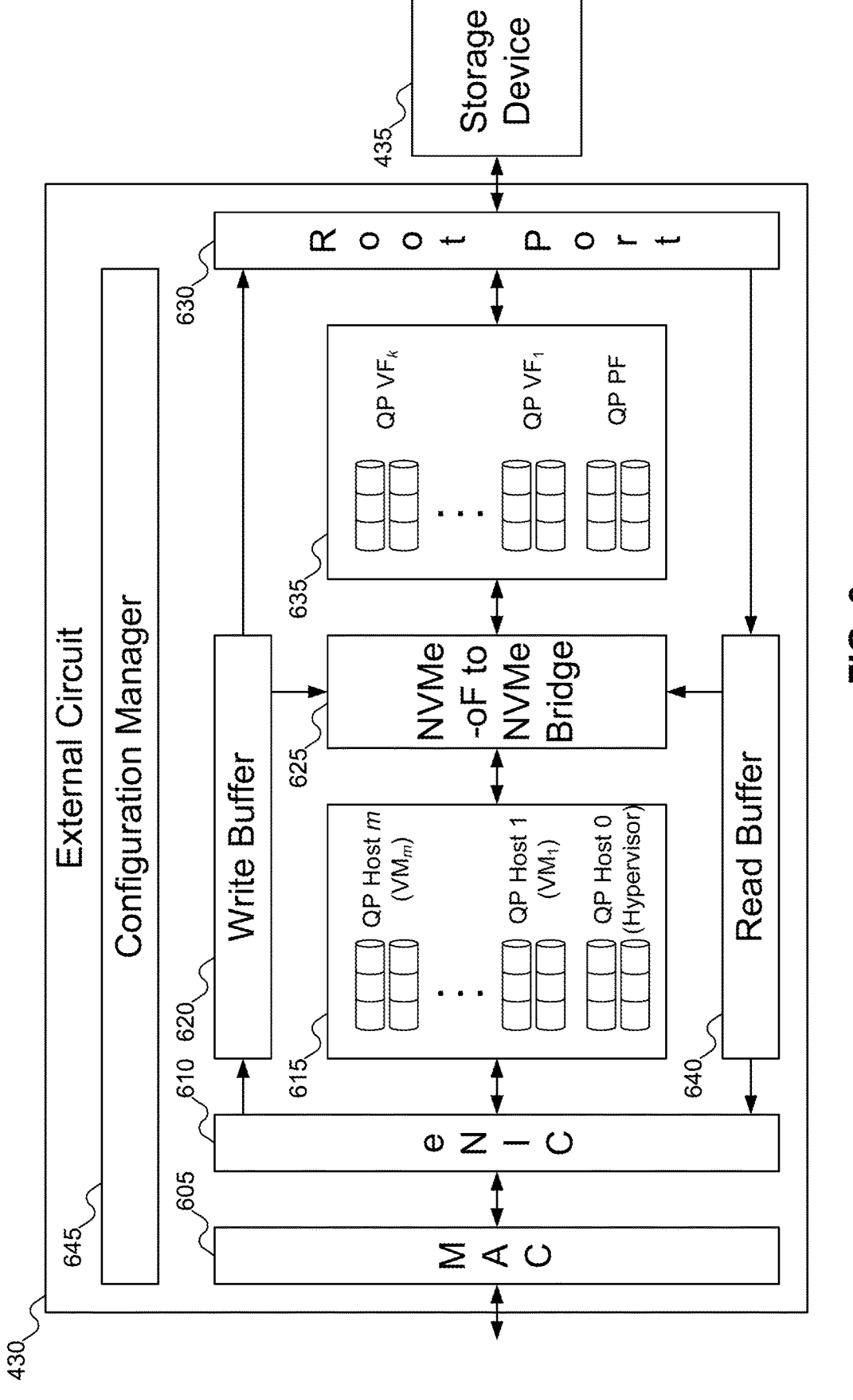
FIG. 6 shows details of the bridging device of FIG. 4B, according to embodiments of the inventive concept.

FIG. 6 shows details of bridging device 430 of FIG. 4B, according to embodiments of the inventive concept. In FIG. 6, bridging device 430 may be implemented using a processor, an FPGA, an ASIC, a GPU, or a GPGPU, to name a few possible implementations. Bridging device 430 may also be implemented using software which may run on appropriately available hardware, or a combination of the hardware and software implementations.

Bridging device 430 may include media access controller (MAC) 605 and embedded network interface controller (eNIC) 610. MAC 605 may act as the physical interface for bridging device 430, permitting bridging device 430 to receive communications from remote hosts, such as remote hosts 305-1, 305-2, and 305-3 of FIG. 3 (or from VMs running on those remote hosts). eNIC 610 may act like a network interface controller, translating the signals received via MAC 605, interpreting the protocol (such as NVMeoF) used to transmit the data, and so on. Together, MAC 605 and eNIC 610 may implement network protocols and the physical and data link layers for network communication with the remote hosts. Any desired transport layer may be used: for example, RDMA over Converged Ethernet (RoCE), RDMA over Converged Ethernet V2, RDMA on InfiniBand Network Connections, Internet Wide Area RDMA Protocol (iWARP), Small Computer System Interface (SCSI) RDMA Protocol, NVMe over Transmission Control Protocol (TCP), or NVMe over Fiber Channel, to name a few possible transport layer protocols. The message may be encoded by the remote host using, for example, submission queue entry (SQE) or scatter-gather lists (SGL) among other techniques before being encapsulated for transmission as an NVMeoF message.

Upon receipt of an NVMeoF message, bridging device 430 may assign a tag to the message. This tag may be assigned by MAC 605, eNIC 610, or any other component of bridging device 430. By assigning tags to NVMeoF messages, bridging device 430 may keep track of the various messages from various remote hosts being handled concurrently by bridging device 430.

Bridging device 430 may extract the command from the NVMeoF message, which may be placed in a submission queue of NVMeoF submission/completion queue pair 615 within bridging device 430 for the remote host. As shown in FIG. 4, bridging device 430 may include any number of NVMeoF submission/completion queue pairs 615, one for each remote host (or VM on a remote host) that is communicating with multiple function storage device 125 of FIG. 1. (Note that since bridging device 430 may be responsible for sending responses to the remote host once a submission has been completely proceed—as opposed to the remote host retrieving the response from bridging device 430—NVMeoF submission/completion queue pair 615 may only include a submission queue, and may omit the completion queue. For purposes of this discussion, the term "submission/completion queue pair" is defined to mean either a pair of queues, one for submissions and one for completions, or a single queue just for submissions.)

In addition to NVMeoF submission/completion queue pair 615, bridging device 430 may include write buffer 620. Write buffer 620 may be used to store data received from the remote host that is to be written to storage device 435. That is, when bridging device 430 receives a write request from the remote host, the request itself may be stored in NVMeoF submission/completion queue pair 615, while the data to be written may be stored in write buffer 620. As discussed below, storage device 435 may access the data from write buffer 620 to perform the write request, or bridging device 430 may retrieve the data from write buffer 620 and include the data as part of the request when sent to storage device 435. Write buffer 620 may be implemented using on-chip storage or external memory, such as memory 115 of FIG. 1 (which may be, for example, Dual Data Rate (DDR) DRAM).

At this point, the message that originated from the remote host may still use the protocol used by the remote host: for example, NVMeoF. But storage device 435 may use a different protocol: for example, NVMe. To handle this translation from one protocol to another, bridging device 430 may include NVMeoF-to-NVMe bridge 625. (If protocols other than NVMeoF or NVMe are used, NVMeoF-to-NVMe bridge 625 may be replaced with bridges translating between other protocols: thus the more general term bridge circuit may be used to describe NVMeoF-to-NVMe bridge 625.) While NVMeoF and NVMe have similarities, they also have some differences. For example, NVMeoF may use messaging for communication, whereas NVMe may use memory space transactions to pass requests and data between the storage device and its host. Thus, information in the request from the remote host relating to the message may be stored in some shared memory (such as write buffer 620 for data to be written to the storage device, or some other shared memory for the request itself) rather than wrapped in a message. To that end, NVMeoF-to-NVMe bridge 625 may act to terminate the NVMeoF protocol used by the remote host and may generate (act as the root) the NVMe protocol for the NVMe controller used by storage device 435. NVMeoF-to-NVMe bridge 625 may act as a lightweight PCIe root complex (through root port 630), to perform PCIe enumeration, initialization, and configuration of storage device 435 and its controller. Root port 630 may be used to host communications with storage device 435, supporting enumeration of storage device 435 via PCIe. While FIG. 6 shows bridging device 430 including one root port 630, embodiments of the inventive concept may have bridging device 430 include any number (one or more) root ports 630.

On the NVMe side of NVMeoF-to-NVMe bridge 625, bridging device 430 may communicate with storage device 435 using another protocol, such as NVMe. Bridging device 430 may include NVMe submission/completion queue pairs 635. Bridging device 430 may include one NVMe submission/completion queue pair 635 for each function exposed by storage device 435. Since storage device 435 may expose more than one function, there may be more than one NVMe submission/completion queue pair for each storage device 435. For example, FIG. 6 shows three NVMe submission/completion queue pairs: one for a PF, one for $VF_1$, and one for $VF_k$.

In addition, for a given function exposed by storage device 435, there may be more than one NVMe submission/completion queue pair. For example, bridging device 430 may support two (or more) NVMe submission/completion queue pairs for a single exposed function to support QoS provisions for the VM using that exposed function: one queue pair may be used for normal requests, while the other queue pair may be used for priority requests (which might be processed before any requests pending in the queue pair used for normal requests).

Bridging device 430 may also include read buffer 640. Read buffer 640 is similar to write buffer 620, and may be used to buffer data read from storage device 435. As data is read from storage device 435, the read data may be buffered in read buffer 640 until all the data has been read. Once all the data has been read, the data may be read from read buffer 640 and assembled into a message that may be sent to the remote host using, for example, the NVMeoF protocol. Read buffer 640 may be implemented using on-chip storage or external memory, such as memory 115 of FIG. 1 (which may be, for example, Dual Data Rate (DDR) DRAM).

There are a number of reasons why bridging device 430 may include write buffer 620 and read buffer 640. One reason to include write buffer 620 and read buffer 640 may be to expedite command processing. For example, if the command requested by the remote host involves processing a large amount of data, waiting until all the data has become available could result in the overall processing of the request taking longer than is desirable. By processing the request in smaller chunks, each chunk may be processed as soon as the chunk is available, which may result in faster overall processing.

Another reason to include write buffer 620 and read buffer 640 may be to support commands involving very large amounts of data. Depending on the protocol used for communicating with storage device 435, there may be a finite limit to how much data may be sent to or received from storage device 435 in response to a single request. Write buffer 620 and read buffer 640 may be used to stage data received from or to be sent to the remote host for requests that might otherwise exceed the size of a request handled by storage device 435.

Because NVMeoF-to-NVMe bridge 625 places messages in NVMe submission/completion queue pairs 635 to send messages to storage device 435, and places responses in NVMeoF submission/completion queue pairs 615 to send responses to remote hosts 305-1, 305-2, and/or 305-3 of FIG. 3, NVMeoF-to-NVMe bridge 625 may store a map between remote hosts and functions exposed by storage device 435. This map may include, for example, a table, correlating functions with the remote hosts sending requests to those functions.

Once bridging device 430 has received all the data from storage device 435 (via a completion queue of NVMe submission/completion queue pairs 635), NVMeoF-to-NVMe bridge 625 may convert the response(s) from the NVMe protocol to the NVMeoF protocol. This process may involve, for example, taking memory space transactions and generating responses appropriate to the original NVMeoF requests. Bridging device 430 may encapsulate a completion queue entry as an NVMeoF message for transmission back to the remote host.

As implied above with reference to FIG. 4B, hypervisor 405 of FIG. 4B may also communicate with storage device 435. Hypervisor 405 of FIG. 4B might not be sending user data to or receiving user data from storage device 435; but hypervisor 405 may want to configure storage device 435 and/or bridging device 430. Thus, bridging device 430 may include NVMeoF submission/completion queue pairs 615 for hypervisor 405 of FIG. 4B (with NVMe submission/completion queue pairs 635 "corresponding" for the PF exposed by storage device 435). Hypervisor 405 of FIG. 4B may use its NVMeoF submission/completion queue pair 615 to send requests to configure bridging device 430 and/or storage device 435 (more particularly, the functions exposed by storage device 435).

To configure storage device 445, hypervisor 405 of FIG. 4B may send requests to the PF exposed by storage device 435. Examples of ways in which hypervisor 405 of FIG. 4B may configure storage device 435 may include how to configure an NVMe controller for one (or more) of the functions exposed by storage device 435, allocation of resources, such as bandwidth and storage capacity allocated to the functions exposed by storage device 435, and other management of storage device 435. Hypervisor 405 of FIG. 4B may also send privacy and multi-tenancy policies that may be forwarded to PF 440 of FIG. 4B and associated NVMe controller 450-1.

When hypervisor 405 of FIG. 4B sends a request to configure bridging device 430, configuration manager 645 may be used. Examples of commands that may be sent to configuration manager 645 may include Quality of Service (QoS) requirements for one of the VMs running on the remote host and information about what functions to enable or disable on storage device 435. Configuration manager 645 may then use this information to configure bridging device 430. For example, configuration manager 645 may establish additional NVMe submission/completion queue pairs 635 for a particular function exposed by storage device 435, to provide for different ways to organize requests sent to the function.

Bridging device 430 may be responsible for managing QoS for the remote hosts. While the host (more particularly hypervisor 405 of FIG. 4B) may be responsible for generating the QoS policies, bridging device 430 may enforce the policies. Bridging device 430 may enforce QoS policies in any desired component: for example, QoS policies may be enforced by eNIC 610, NVMeoF submission/completion queue pairs 615, NVMeoF-to-NVMe bridge 625, NVMe submission/completion queue pairs 635, or root port 630. In addition, bridging device circuit 430 may have NVMe controller 450-1 of FIG. 4B associated with PF 440 of FIG. 4B operate as an administrative module.

Bridging device 430 may ensure that data is isolated between different remote hosts, but that all remote hosts (and all requests issued by remote host) are processed fairly. For example, bridging device 430 may ensure that no request may be preempted forever by higher priority requests. Bridging device 430 may also provide monitoring information to hypervisor 405 of FIG. 4B, so that hypervisor 405 of FIG. 4B may monitor the effectiveness of the QoS policies and fine-tuning them as appropriate.

Configuration manager 645 has other uses as well. Configuration manager 645 may be used to configure the SR-IOV capability of storage device 435. Configuration manager 645 may also create, remove, configure, and manage the exposed functions of storage device 435, based on what functions are requested by hypervisor 405 of FIG. 4B.

While FIG. 6 shows bridging device 430 connected to one storage device 435, embodiments of the inventive concept may include bridging device 430 of FIG. 4B connected to more than one storage device 435. For each attached storage device 435, bridging device 430 may include a separate root port 630, or root port 630 may be shared by more than one storage device 435. In addition, while the above discussion suggests that storage device 435 of FIG. 4B may include one PF with a number of related VFs, embodiments of the inventive concept may include storage device 435 exposing more than one PF (with a set of related VFs for each exposed PF).

Figure 7:
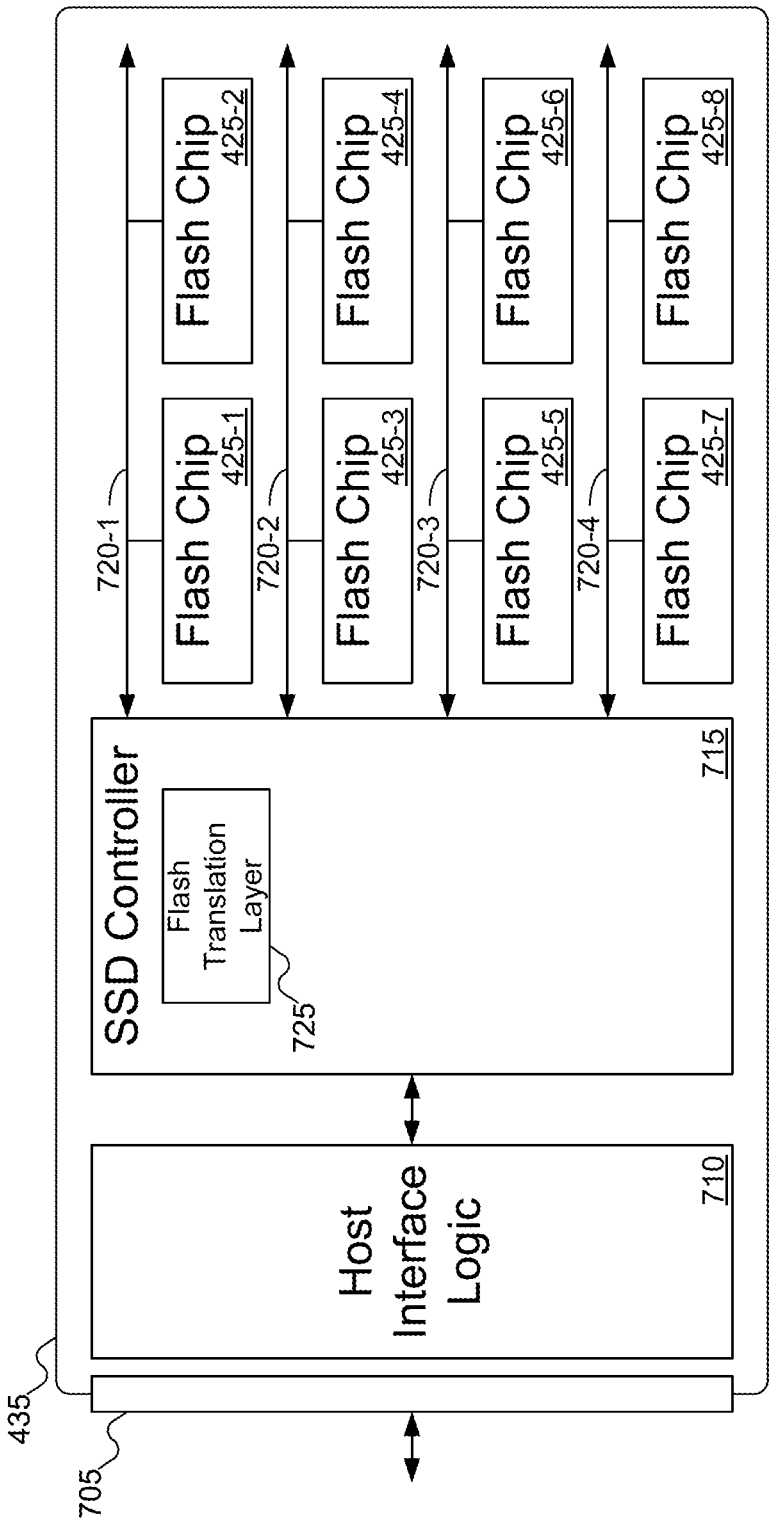
FIG. 7 shows details of the Non-Volatile Memory Express (NVMe) SSD of FIG. 4B, according to embodiments of the inventive concept.

FIG. 7 shows details of NVMe SSD 435 of FIG. 4B, according to embodiments of the inventive concept. In FIG. 7, NVMe SSD 435 may include connector 705 (which may also be termed a port), which may be used to connect NVMe SSD 435 to bridging device 430 of FIG. 4B. NVMe SSD 435 may also include host interface 710 (which may also be termed a host interface logic, or HIL), SSD controller 715, and various flash memory chips 425-1 through 425-8 (also termed flash memory storage), which may be organized into various channels 720-1 through 720-4. Host interface logic 710 may manage communications between NVMe SSD 435 and other components (such as bridging device 430 of FIG. 4B). Host interface logic 710 may manage an interface across only a single connector 705, or it may manage interfaces across multiple connectors 705. Alternatively, NVMe SSD 435 may include multiple connectors 705, each of which may have a separate host interface logic 710 to manage interfaces across that connector 705. Embodiments of the inventive concept may also mix the possibilities (for example, an SSD with three connectors might have one host interface logic to manage one connector and a second host interface logic to manage the other two connectors).

SSD controller 715 may manage the read and write operations, along with garbage collection and other operations, on flash memory chips 425-1 through 425-8 using a flash memory controller (not shown in FIG. 7). SSD controller 715 may include flash translation layer 725. SSD controller 715 may be implemented using hardware in some form: for example, as a custom controller for NVMe SSD 435 such as an FPGA, an ASIC, a general purpose processor, a GPU, or a GPU, possibly with appropriate software, among other possibilities.

SSD controller 715 may include flash translation layer 730, which may manage translation between logical block addresses as used by bridging device 430 of FIG. 6 and physical block addresses in flash chips 425-1 through 425-8 where the data is stored. While FIG. 7 shows SSD controller 715 as including flash translation layer 730, embodiments of the inventive concept may locate flash translation layer 730 in any desired location. Embodiments of the inventive concept may also locate these modules within different portions of NVMe SSD 435: for example, none of these modules might be within SSD controller 715.

While FIG. 7 shows NVMe SSD 435 as including eight flash memory chips 425-1 through 425-8 organized into four channels 720-1 through 720-4, embodiments of the inventive concept may support any number of flash memory chips organized into any number of channels. Similarly, while FIG. 7 shows the structure of a SSD, other storage devices (for example, hard disk drives) may be implemented using a different structure, but with similar potential benefits.

Figure 8:
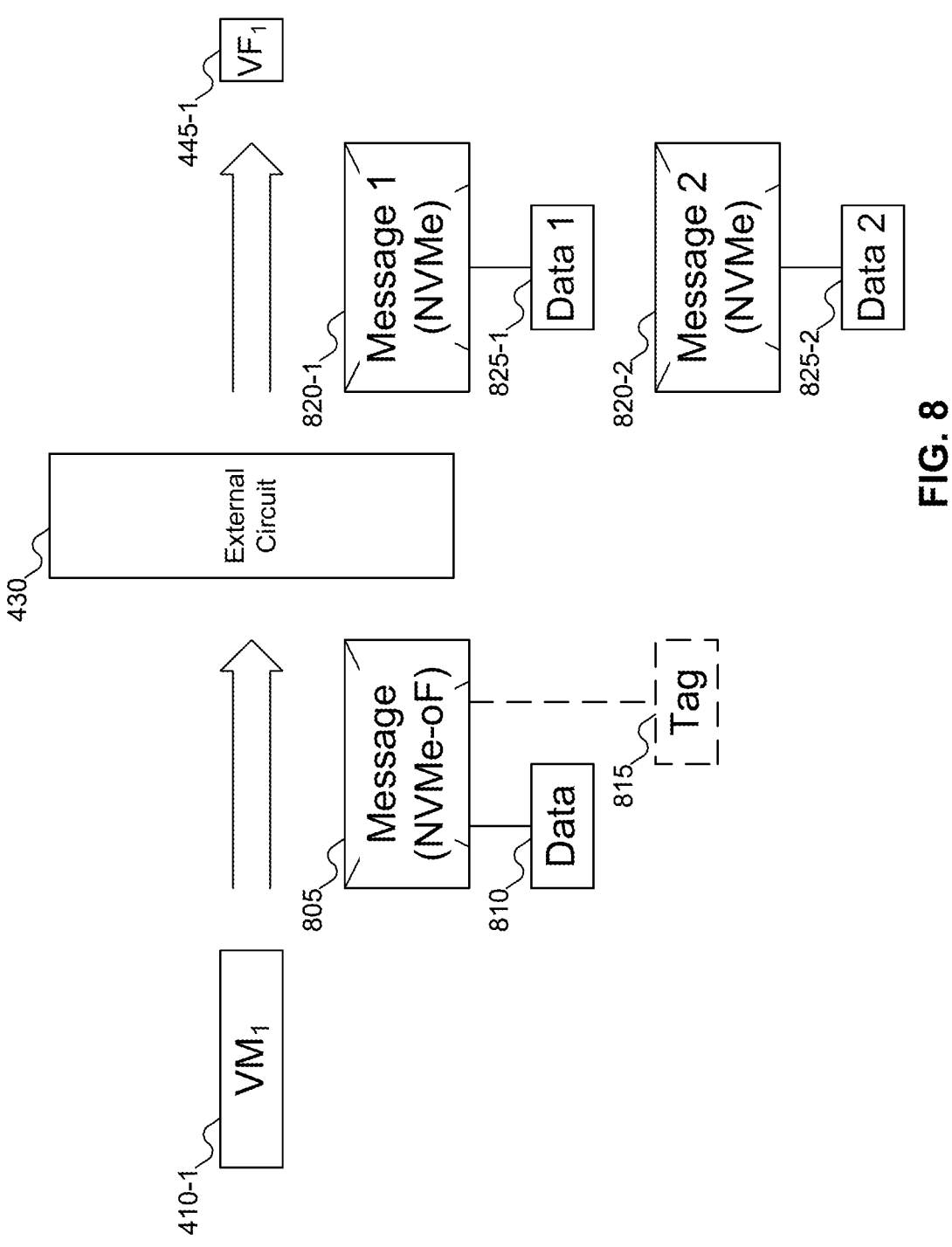
FIGS. 8-9 show the bridging device of FIG. 4B handling messages between the remote hosts of FIG. 3 and the virtual function of FIG. 4B of the multiple function storage device of FIG. 1, according to embodiments of the inventive concept.
Figure 9:
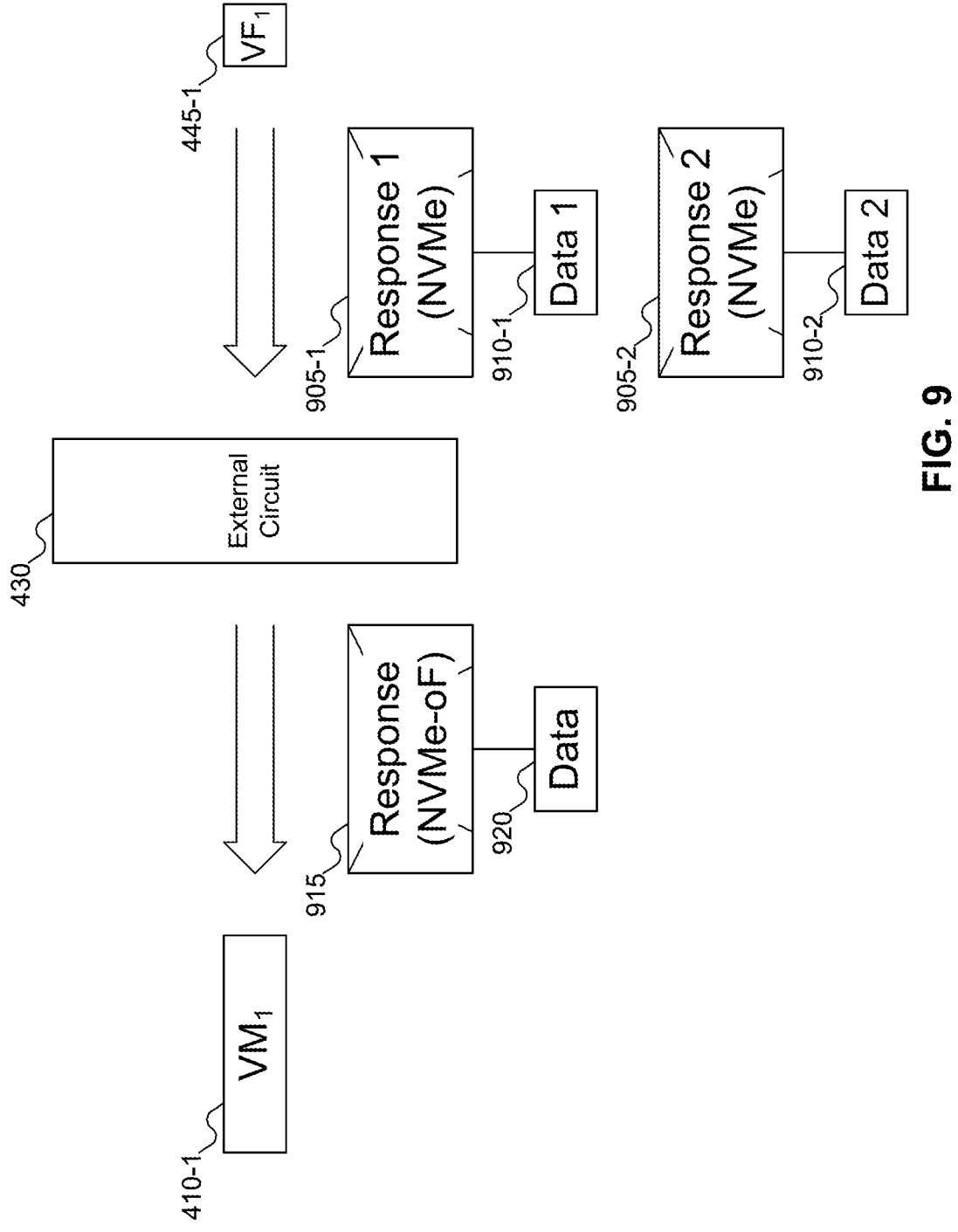

FIGS. 8-9 show bridging device 430 of FIG. 4B handling messages between remote hosts 305-1, 305-2, and 305-3 of FIG. 3 and virtual functions 445-1 and 445-2 of FIG. 4B of multiple function storage device 125 of FIG. 1. In FIG. 8, VM 410-1 is shown sending message 805 toward NVMe SSD 435 of FIG. 4B (recall that VM 410-1 is agnostic to the fact that bridging device 430 makes NVMe SSD 435 of FIG. 4B appear to be multiple NVMeoF SSDs). Message 805 may use the NVMeoF protocol, and may include data 810.

Upon receiving message 805, bridging device 430 may apply tag 815 to message 805, so that bridging device 430 may distinguish message 430 from messages sent by other remote hosts (or from other messages sent by VM 410-1). Bridging device 430 may then use the submission queue of NVMeoF submission/completion queue pairs 615 of FIG. 6 and NVMeoF-to-NVMe bridge 625 of FIG. 6 to translate (NVMeoF) message 805 into messages 820-1 and 820-2, which may be in the NVMe protocol. Each message 820-1 and 820-2 may include its own data 825-1 and 825-2, respectively. Messages 820-1 and 820-2 may be placed in the submission queue of NVMe submission/completion queue pair 635 of FIG. 6 appropriate to VF 445-1 (which is the function that appears to VM 410-1 as the target NVMeoF SSD). Messages 820-1 and 820-2 may include information that associates them with tag 815: for example, part of messages 820-1 and 820-2 may be tag 815 itself, enabling NVMeoF-to-NVMe bridge 625 of FIG. 6 to prepare the appropriate response to message 805 once VF 445-1 has completed processing the request. Alternatively, bridging device 430 may keep track internally of (NVMe) messages 820-1 and 820-2 being associated with (NVMeoF) message 805.

Note that (NVMeoF) message 805 may spawn multiple (NVMe) messages 820-1 and 820-2. As discussed above with reference to FIG. 6, this may be because it may be more efficient (or necessary due to other considerations) to send multiple sub-commands to VF 445-1 than to send a single command to VF 445-1. For example, a single NVMeoF write request may place data in chunks into write buffer 620 of FIG. 6, with each chunk becoming a part of a separate (NVMe) write request sent to VF 445-1. While FIG. 8 shows two messages 820-1 and 820-2, in response to (NVMeoF) message 805 bridging device 430 may send any number (one or more) of (NVMe) messages to VF 445-1, depending on (NVMeoF) message 805.

Messages 820-1 and 820-2 may differ in some details from message 805 (for example, the protocols used in the messages). But in context, messages 820-1 and 820-2 may be generated by NVMeoF-to-NVMe bridge 625 of FIG. 6 based on message 805. Thus, messages 820-1 and 820-2 may be said to "originate" from VM 410-1. In theory message 805 may itself be relayed from another host—for example, if VM 410-1 or remote host 305-1 of FIG. 3 is operating as a router—in which case message 805 may be said to "originate" at any of VM 410-1, remote host 305-1 of FIG. 3, or the host that sent the original message to remote host 305-1 of FIG. 3/VM 410-1, depending on the point of view applied.

FIG. 9 shows the reverse operation of FIG. 8. In FIG. 9, VF 445-1 may send one or more (NVMe) responses 905-1 and 905-2 to bridging device 430. These responses 905-1 and 905-2 may include data 910-1 and 910-2. These responses may be received in the completion queue of NVMe submission/completion queue pair 635 of FIG. 6. Once all responses to the original (NVMeoF) message 805 of FIG. 8 have been received, bridging device 430 may then produce (NVMeoF) response 915, with data 920, which may be placed in the completion queue of NVMeoF completion queue 615 of FIG. 6 (or message 915 may be sent directly to VM 410-1 without using the completion queue of NVMeoF submission/completion queue pair 615 of FIG. 6).

As discussed above with reference to FIG. 8, messages 820-1 and 820-2 of FIG. 8 may include tag 815 of FIG. 8 to keep messages 820-1 and 820-2 of FIG. 8 matched with (NVMeoF) message 805 of FIG. 8. VF 445-1 may then include those tags in responses 905-1 and 905-2 when responses 905-1 and 905-2 are sent back to bridging device 430.

Since (NVMeoF) message 805 of FIG. 8 may spawn multiple (NVMe) messages 820-1 and 820-2 of FIG. 8, VF 445-1 may generate multiple response 905-1 and 905-2. Typically, VF 445-1 may generate one response 905-1 and 905-2 for each message 820-1 and 820-2 of FIG. 8, but in some embodiments of the inventive concept two or more messages may result in a single response, or a single message may result in two or more responses. As discussed above with reference to FIG. 6, this may be because it may be more efficient (or necessary due to other considerations) for VF 445-1 to send multiple sub-responses to bridging device 430 than for VF 445-1 to send a single response to bridging device 430.

Figure 10A:
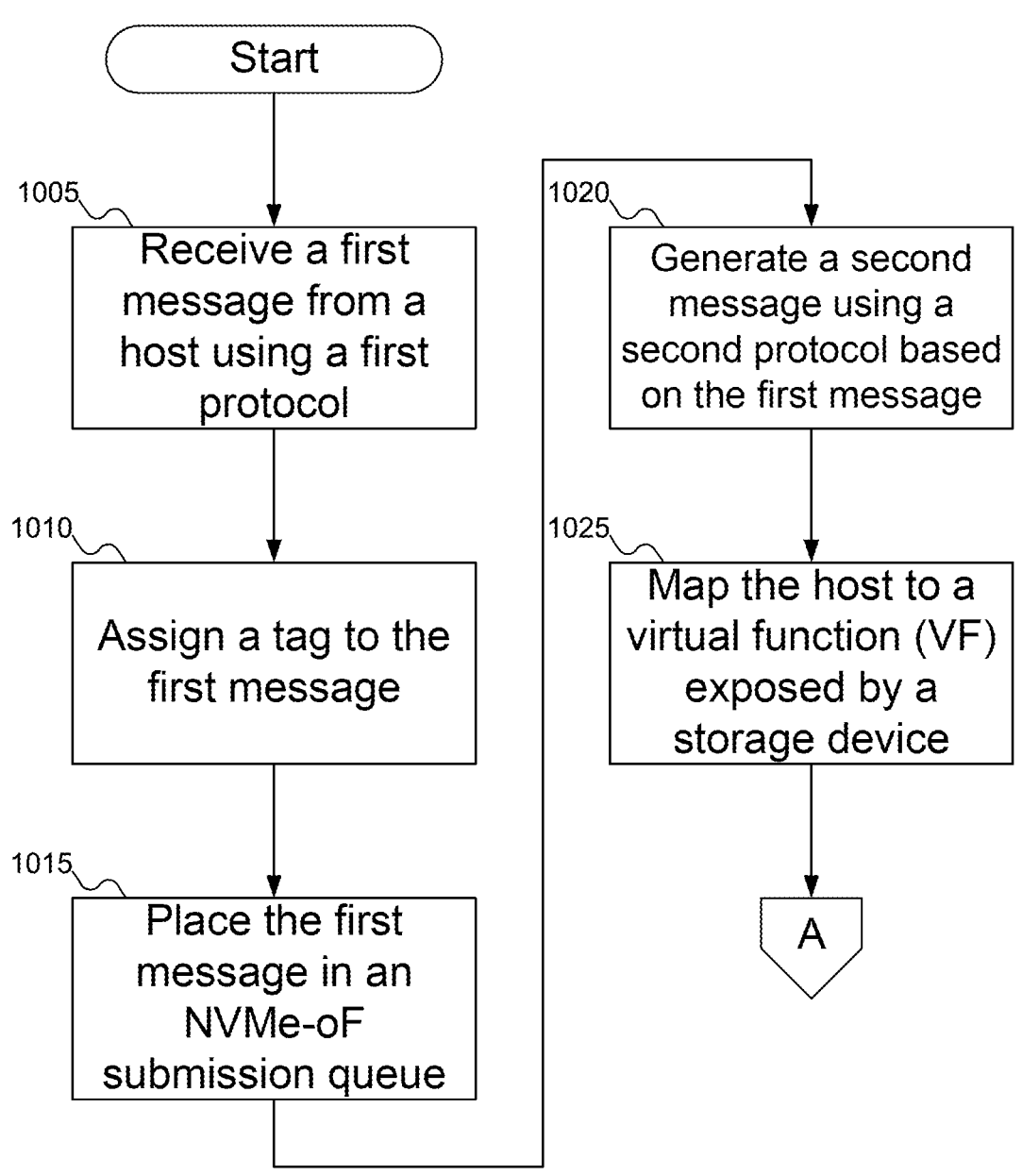
FIGS. 10A-10B show a flowchart of an example procedure for the bridging device of FIG. 4B to process messages between the remote hosts of FIG. 3 and the virtual function of FIG. 4B of the multiple function storage device of FIG. 1, according to embodiments of the inventive concept.
Figure 10B:
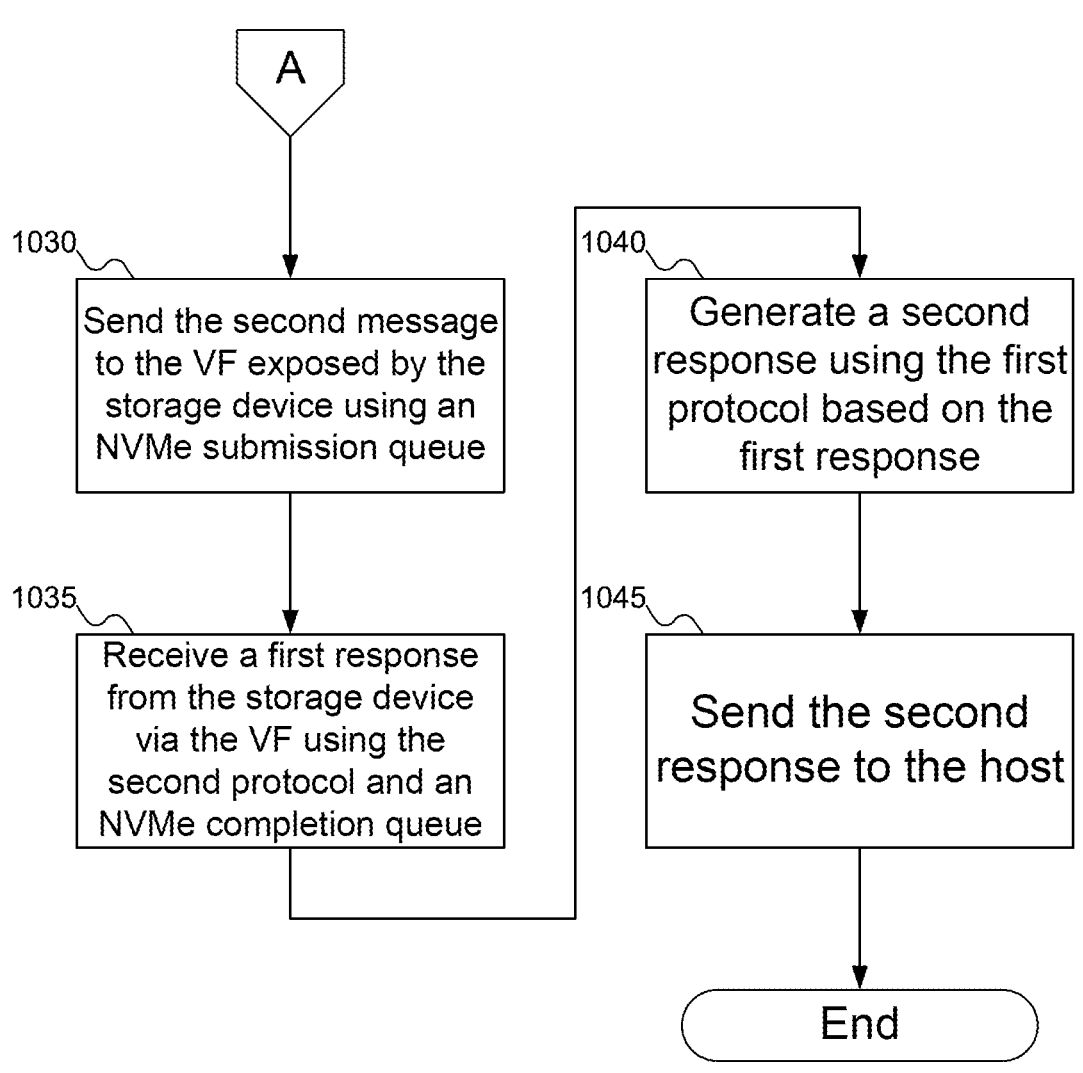

FIGS. 10A-10B show a flowchart of an example procedure for bridging device 430 of FIG. 4B to process messages between remote hosts 305-1, 305-2, and 305-3 of FIG. 3 and functions 440, 445-1, and 445-2 of FIG. 4B of storage device 435 of FIG. 4B, according to embodiments of the inventive concept. In FIG. 10A, at block 1005, bridging device 430 of FIG. 6 may receive NVMeoF message 805 of FIG. 8 from remote hosts 305-1, 305-2, or 305-3 of FIG. 3. At block 1010, bridging device 430 of FIG. 6 may assign tag 815 to NVMeoF message 805 of FIG. 8. At block 1015, bridging device 430 of FIG. 6 may place NVMeoF message 805 of FIG. 8 in a submission queue of NVMeoF submission/completion queue pair 615 of FIG. 6. This process may also involve storing write data 810 of FIG. 8 in write buffer

620 of FIG. 6. At block 1020, NVMeoF-to-NVMe bridge 625 of FIG. 6 may generate NVMe message(s) 820-1 and 820-2 of FIG. 8 based on NVMeoF message 805 of FIG. 8. At block 1025, bridging device 430 of FIG. 6 may map remote host 305-1, 305-2, or 305-3 of FIG. 3 to function 440, 445-1, or 445-2 of FIG. 4B exposed by storage device 435 of FIG. 4B.

At block 1030 (FIG. 10B), bridging device 430 of FIG. 6 may send message(s) 820-1 and/or 820-2 of FIG. 8 to storage device 435 of FIG. 4B. Messages 820-1 and/or 820-2 of FIG. 8 may use the NVMe protocol. Bridging device 430 of FIG. 6 may send message(s) 820-1 and/or 820-2 of FIG. 8 to storage device 435 of FIG. 4B by placing message(s) 820-1 and/or 820-2 of FIG. 8 to storage device 435 of FIG. 4B in a submission queue of NVMe submission/completion queue pair 635 of FIG. 6. Storage device 435 of FIG. 4B may retrieve messages 820-1 and/or 820-2 of FIG. 8 from NVMe submission/completion queue pair 635 of FIG. 6 when it is time to process message(s) 820-1 and/or 820-2 of FIG. 8 to storage device 435 of FIG. 4B, or bridging device 430 of FIG. 6 may generate memory space transactions for message(s) 820-1 and/or 820-2 of FIG. 8 to storage device 435 of FIG. 4B and post them to storage device 435 of FIG. 4B when it is time for storage device 435 of FIG. 4B to process message(s) 820-1 and/or 820-2 of FIG. 8 to storage device 435 of FIG. 4B.

Eventually, storage device 435 of FIG. 4B may post NVMe response(s) 905-1 and/or 905-2 of FIG. 9 to the completion queue of NVMe submission/completion queue 635 of FIG. 6. Storage device 435 of FIG. 4B may place responses 905-1 and/or 905-2 of FIG. 9 in NVMe submission/completion queue pair 635 of FIG. 6, or storage device 435 of FIG. 4B may generate memory space transactions for responses 905-1 and/or 905-2 of FIG. 9 and post them to bridging device 430 of FIG. 6 when responses 905-1 and/or 905-2 of FIG. 9 are ready. At block 1035, bridging device 430 of FIG. 6 may receive responses 905-1 and/or 905-2 of FIG. 9 from storage device 435 of FIG. 4B, perhaps by retrieving them from the completion queue of NVMe submission/completion queue pair 635 of FIG. 6. This process may involving reading read data 910-1 and/or 910-2 of FIG. 9 from read buffer 640 of FIG. 6. At block 1040, NVMeoF-to-NVMe bridge 625 of FIG. 6 may generate NVMeoF response 915 of FIG. 9. Finally, at block 1045, bridging device 430 of FIG. 6 may send response 915 of FIG. 9 to remote host 305-1, 305-2, or 305-3 of FIG. 3, either by placing response 915 of FIG. 9 in the completion queue of NVMeoF submission/completion queue pair 615 of FIG. 6 or by sending response 915 of FIG. 9 directly to remote host 305-1, 305-2, or 305-3 of FIG. 3.

While FIGS. 10A-10B describe the process for handling a single message from a remote host, embodiments of the inventive concept may include bridging device 430 of FIG. 6 performing the operations described in FIGS. 10A-10B multiple times, potentially concurrently and with different messages at different stages of processing. That is, the example process shown in FIGS. 10A-10B may be performed multiple times, with different messages from different remote hosts being communicated to different functions exposed by storage device 435 of FIG. 4B.

Figure 11:
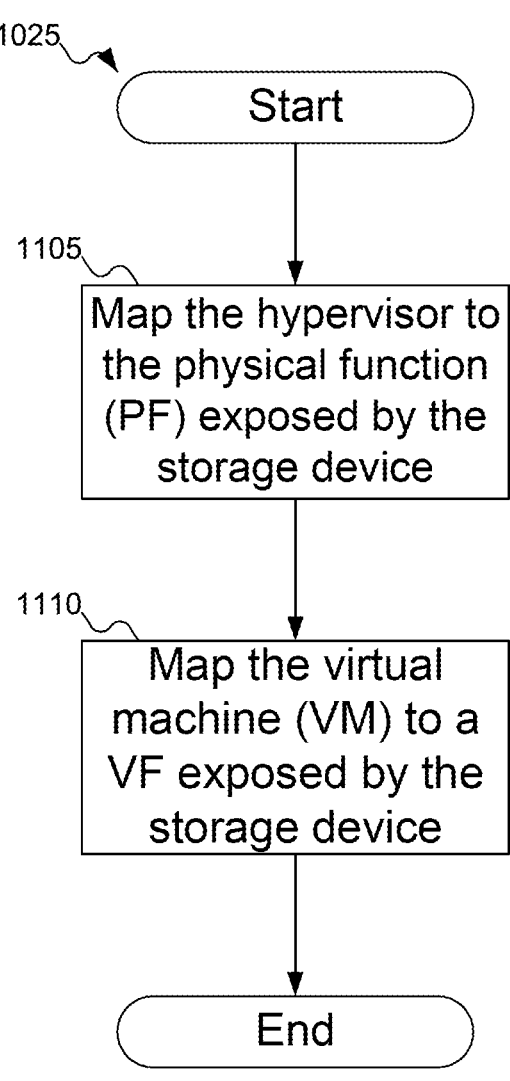
FIG. 11 show a flowchart of an example procedure for the bridging device of FIG. 4B to map remote hosts to functions exposed by the multiple function storage device of FIG. 4B, according to embodiments of the inventive concept.

FIG. 11 show a flowchart of an example procedure for bridging device 430 of FIG. 4B to map remote hosts to functions 440, 445-1, and 445-2 exposed by storage device 435 of FIG. 4B, according to embodiments of the inventive concept. In FIG. 11, at block 1105, bridging device 430 of FIG. 6 may map hypervisor 405 of FIG. 4B to PF 440 of FIG. 4B, and at block 1110, bridging device 430 of FIG. 6 may map individual VMs 410-1, 410-2, and 410-3 of FIG. 4B to VFs 445-1 and 445-2 of FIG. 4B.

Figure 12:
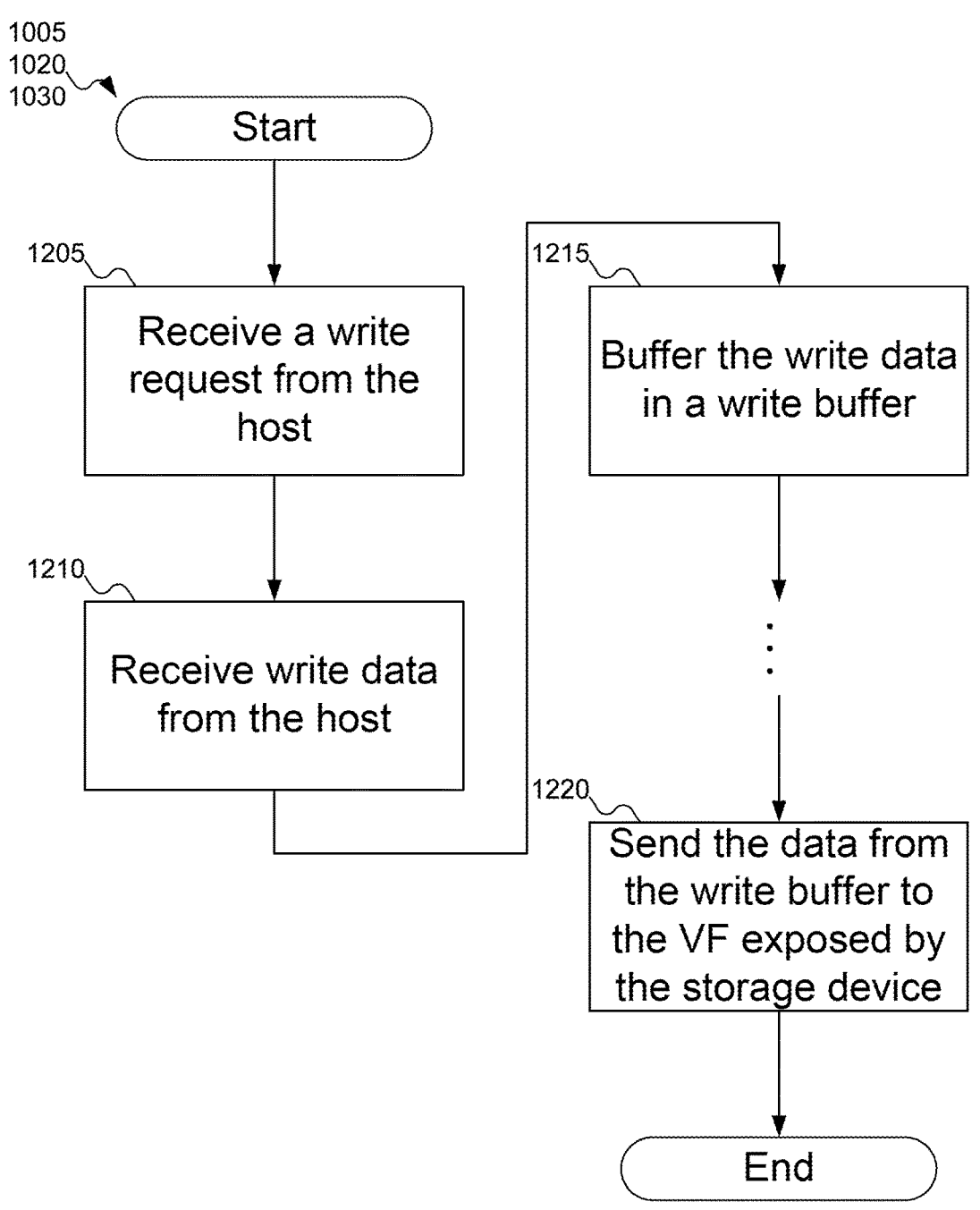
FIG. 12 shows a flowchart of an example procedure for the bridging device of FIG. 4B to process a write request received from the remote hosts of FIG. 3, according to embodiments of the inventive concept.

FIG. 12 shows a flowchart of an example procedure for bridging device 430 of FIG. 4B to process write request 805 of FIG. 8 received from remote hosts 305-1, 305-2, and 305-3 of FIG. 3, according to embodiments of the inventive concept. In FIG. 12, at block 1205, bridging device 430 of FIG. 6 may receive write request 805 of FIG. 8 from remote host 305-1, 305-2, and/or 305-3 of FIG. 3. At block 1210, bridging device 430 of FIG. 6 may receive write data 810 of FIG. 8 from remote hosts 305-1, 305-2, and/or 305-3 of FIG. 3. At block 1215, bridging device 430 of FIG. 6 may buffer write data 810 of FIG. 8 in write buffer 620 of FIG. 6. Blocks 1210 and 1215 may repeat if write data 810 of FIG. 8 is received from remote hosts 305-1, 305-2, and/or 305-3 of FIG. 3 in chunks. Finally, at block 1220, bridging device 430 of FIG. 6 may send write data 810 of FIG. 8 from write buffer 620 of FIG. 6 to VF 445-1 or 445-2 of FIG. 4B (as discussed above, this may involve sending write data 810 of FIG. 8 as part of NVMe message(s) 820-1 and/or 820-2 of FIG. 8, or using a memory space transaction).

Figure 13:
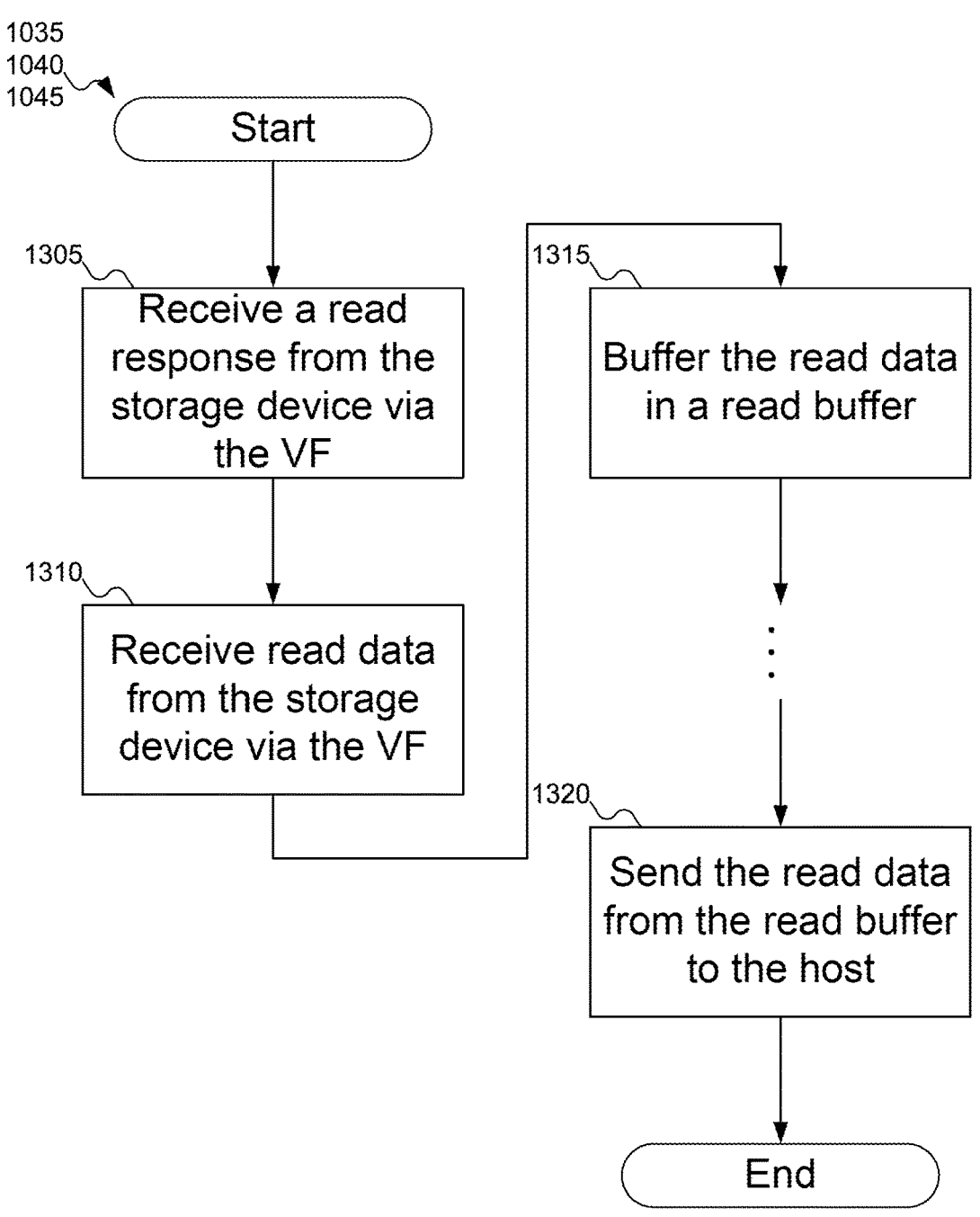
FIG. 13 shows a flowchart of an example procedure for the bridging device of FIG. 4B to process read responses from the virtual function of FIG. 4B of the multiple function storage device of FIG. 1, according to embodiments of the inventive concept.

FIG. 13 shows a flowchart of an example procedure for bridging device 430 of FIG. 4B to process read responses 905-1 and 905-2 of FIG. 9 from virtual functions 445-1 and 445-2 of FIG. 4B of multiple function storage device 125 of FIG. 1, according to embodiments of the inventive concept. In FIG. 13, at block 1305, bridging device 430 of FIG. 6 may receive read response(s) 905-1 and/or 905-2 of FIG. 9 from VF 445-1 or 445-2 of FIG. 4B (as discussed above, this may involve sending write data 810 of FIG. 8 as part of NVMe message(s) 820-1 and/or 820-2 of FIG. 8, or using a memory space transaction). At block 1310, bridging device 430 of FIG. 6 may receive read data 910-1 and/or 910-2 of FIG. 9 from VF 445-1 or 445-2 of FIG. 4B. At block 1315, bridging device 430 of FIG. 6 may buffer read data 910-1 and/or 910-2 of FIG. 9 in read buffer 640 of FIG. 6. Blocks 1310 and 1315 may repeat if there are multiple chunks of read data 910-1 and/or 910-2 of FIG. 9 to be received from VF 445-1 or 445-2 of FIG. 4B. Finally, at block 1320, bridging device 430 of FIG. 6 may send read data 920 of FIG. 9 from read buffer 640 of FIG. 6 to remote hosts 305-1, 305-2, and/or 305-3 of FIG. 3.

Figure 14:
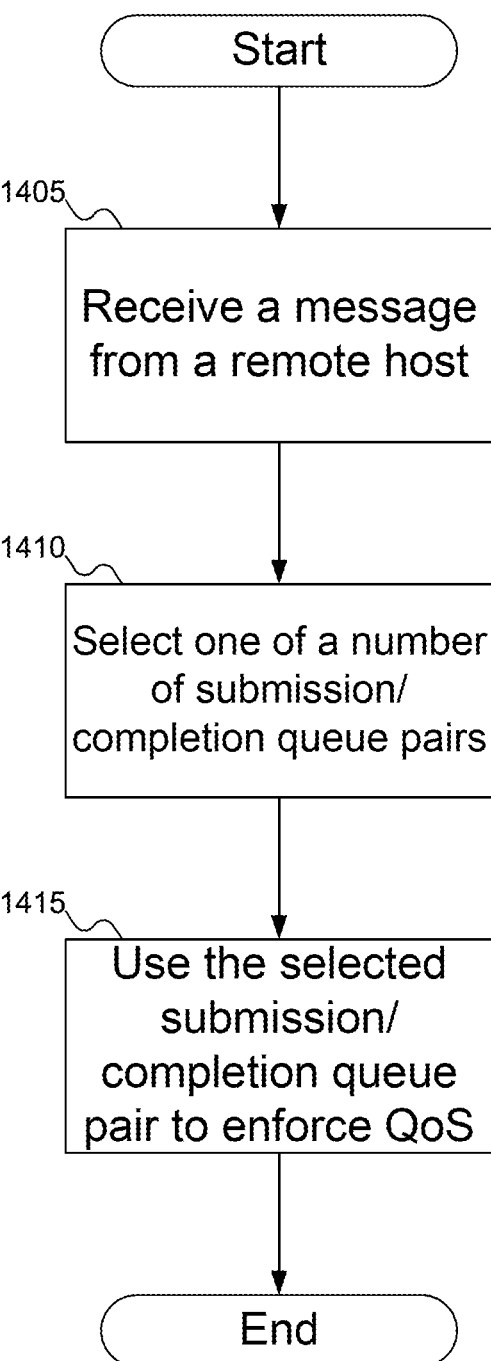
FIG. 14 shows a flowchart of an example procedure for the bridging device of FIG. 4B to use submission/completion queue pairs to enforce Quality of Service (QoS) provisions, according to embodiments of the inventive concept.

FIG. 14 shows a flowchart of an example procedure for bridging device 430 of FIG. 4B to use submission/completion queue pairs to enforce QoS provisions, according to embodiments of the inventive concept. In FIG. 14, at block 1405, bridging device 430 of FIG. 6 may receive message 805 of FIG. 8 from remote host 305-1, 305-2, or 305-3 of FIG. 3. At block 1410, NVMeoF-to-NVMe bridge 625 may select one of two or more) NVMe submission/completion queue pairs 635 of FIG. 6 to enforce a QoS policy. At block 1405, NVMeoF-to-NVMe bridge 625 of FIG. 6 may use the selected NVMe submission/completion queue pair 635 of FIG. 6 to enforce the QoS policy.

Figure 15:
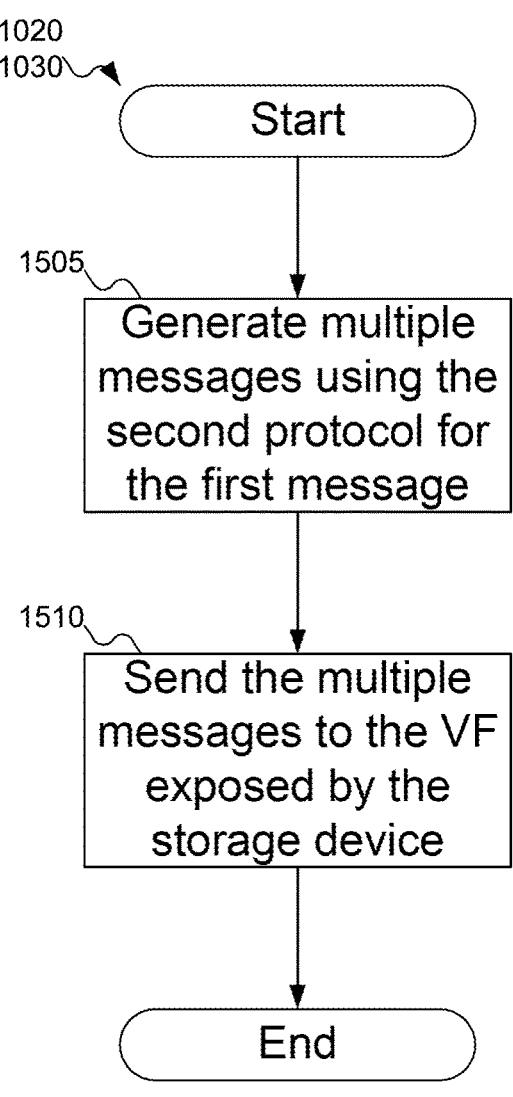
FIG. 15 shows a flowchart of an example procedure for the bridging device of FIG. 4B to use multiple messages sent to the virtual function of FIG. 4B of the multiple function storage device of FIG. 1 to process a message received from the remote hosts of FIG. 3, according to embodiments of the inventive concept.

FIG. 15 shows a flowchart of an example procedure for bridging device 430 of FIG. 4B to use multiple messages sent to virtual functions 445-1 and 445-2 of FIG. 4B of multiple function storage device 125 of FIG. 1 to process a message received from remote hosts 305-1, 305-2, and 305-3 of FIG. 3, according to embodiments of the inventive concept. In FIG. 15, at block 1505, NVMeoF-to-NVMe bridge 625 may generate two or more NVMe messages 820-1 and/or 820-2 of FIG. 8 based at least in part on NVMeoF message 805 of FIG. 8. Finally, at block 1510, NVMeoF-to-NVMe bridge 625 may send the two or more NVMe messages 820-1 and/or 820-2 of FIG. 8 to the appropriate function exposed by storage device 435 of FIG. 4B.

In FIGS. 10A-15, some embodiments of the inventive concept are shown. But a person skilled in the art will recognize that other embodiments of the inventive concept are also possible, by changing the order of the blocks, by omitting blocks, or by including links not shown in the drawings, irrespective of any elements that may specifically be omitted. All such variations of the flowcharts are considered to be embodiments of the inventive concept, whether expressly described or not.

Embodiments of the inventive concept include technical advantages over some implementations. Embodiments of the inventive concept provide for a compact solution to implement multiple storage functions with NVMeoF support. Any storage device exposing functions (such as an SR-IOV storage device) may be used, and multiple remote hosts may connect to the same storage device simultaneously. No special functions or drivers are needed to initialize the virtual functions, and the remote hosts may be completely unaware that the back-end storage devices may not be NVMeoF storage devices, or even physically distinct storage devices. No side-band communications between the hosts or between hosts and storage device are needed to initialize the exposed functions. Embodiments of the inventive concept are cost- and energy-efficient, and the designs are scalable.

The following discussion is intended to provide a brief, general description of a suitable machine or machines in which certain aspects of the inventive concept may be implemented. The machine or machines may be controlled, at least in part, by input from input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a multiple function storage device, comprising:
an enclosure;
a storage device associated with the enclosure, including:
a connector to receive a first message using a first protocol originating at a host;
a physical function (PF) and a virtual function (VF) exposed by the storage device via the connector;
storage for data relating to the first message; and
a controller to manage writing a write data to the storage and reading a read data from the storage; and
an bridging device associated with the enclosure, including:
an embedded network interface controller (eNIC) to receive a second message using a second protocol from the host;
a write buffer to store the write data to be written to the storage device by the host;
a read buffer to store the read data to be read from the storage device for the host;
a bridge circuit to translate the second message using the second protocol into the first message using the first protocol; and a root port to identify the storage device and to transmit the first message to the VF,
wherein the bridging device is configured to map the host to the VF.

Statement 2. An embodiment of the inventive concept includes the multiple function storage device according to statement 1, wherein the storage device implements Single-Root Input/Output Virtualization (SR-IOV).

Statement 3. An embodiment of the inventive concept includes the multiple function storage device according to statement 1, wherein the connector includes a Peripheral Component Interconnect Express (PCIe) connector.

Statement 4. An embodiment of the inventive concept includes the multiple function storage device according to statement 1, wherein the bridging device is implemented using at least one of a processor, a Field Programmable Gate Array (FPGA), an Application-Specific Integrated Circuit (ASIC), a Graphics Processing Unit (GPU), or a general purpose GPU (GPGPU).

Statement 5. An embodiment of the inventive concept includes the multiple function storage device according to statement 1, wherein a connection between the eNIC and the host is one of at least a wired connection, a wireless connection, or an optical connection.

Statement 6. An embodiment of the inventive concept includes the multiple function storage device according to statement 1, wherein the write buffer is one of at least on-chip storage or external memory.

Statement 7. An embodiment of the inventive concept includes the multiple function storage device according to statement 1, wherein the read buffer is one of at least on-chip storage or external memory.

Statement 8. An embodiment of the inventive concept includes the multiple function storage device according to statement 1, wherein:
the multiple function storage device further comprises a second storage device associated with the enclosure, including:
a second connector;
a second PF and a second VF exposed by the second storage device via the second connector;
second storage for data; and
a second controller to manage writing a second write data to the second storage and reading a second read data from the second storage; and
the root port of the bridging device is configured to identify the storage device and the second storage device.

Statement 9. An embodiment of the inventive concept includes the multiple function storage device according to statement 1, wherein:
the storage device is configured to expose the PF, the VF, and a second VF; and
the multiple function storage device is configured to support the host communicating with the storage device using the VF and a second host communicating with the storage device using the second VF.

Statement 10. An embodiment of the inventive concept includes the multiple function storage device according to statement 9, wherein:
the host includes a first hypervisor and a first virtual machine (VM); and
the second host includes a second hypervisor and a second VM.

Statement 11. An embodiment of the inventive concept includes the multiple function storage device according to statement 1, wherein the storage device includes a Solid State Drive (SSD).

Statement 12. An embodiment of the inventive concept includes the multiple function storage device according to statement 11, wherein:

the storage device includes:

a Non-Volatile Memory Express (NVMe) SSD; and a first NVMe controller associated with the PF and a second NVMe controller associated with the VF;

the first protocol includes an NVMe protocol; and the second protocol includes an NVMe Over Fabrics (NVMeoF) protocol.

Statement 13. An embodiment of the inventive concept includes the multiple function storage device according to statement 12, wherein:

the host includes a hypervisor and a VM; and the storage device is configured to communicate with the hypervisor using the PF and to communicate with the VM using the VF.

Statement 14. An embodiment of the inventive concept includes the multiple function storage device according to statement 13, wherein the bridging device includes:

a first NVMeoF submission/completion queue pair for the hypervisor;

a second NVMeoF submission/completion queue pair for the VM;

a first NVMe submission/completion queue pair for the PF; and a second NVMe submission/completion queue pair for the VF.

Statement 15. An embodiment of the inventive concept includes the multiple function storage device according to statement 14, wherein:

the bridging device further includes a third NVMe submission/completion queue pair for the VF; and wherein the bridging device is configured to use the second NVMe submission/completion queue pair and the third NVMe submission/completion queue pair to satisfy a Quality of Service (QoS) requirement for the VM.

Statement 16. An embodiment of the inventive concept includes the multiple function storage device according to statement 13, wherein:

the bridging device includes a configuration manager; and the hypervisor is configured to use the configuration manager to manage the bridging device.

Statement 17. An embodiment of the inventive concept includes the multiple function storage device according to statement 16, wherein the configuration manager is configured to manage the NVMe controller associated with the VF.

Statement 18. An embodiment of the inventive concept includes the multiple function storage device according to statement 16, wherein the hypervisor is configured to establish QoS requirements for the VM.

Statement 19. An embodiment of the inventive concept includes the multiple function storage device according to statement 16, wherein the hypervisor is configured to allocate resources of the storage device to the VM.

Statement 20. An embodiment of the inventive concept includes the multiple function storage device according to statement 16, wherein the hypervisor is configured to enable or disable storage functions of the storage device.

Statement 21. An embodiment of the inventive concept includes the multiple function storage device according to statement 16, wherein the hypervisor is configured to manage the storage device.

Statement 22. An embodiment of the inventive concept includes the multiple function storage device according to statement 12, wherein the bridge circuit is configured to generate at least two first messages to send to storage device based at least in part on the second message.

Statement 23. An embodiment of the inventive concept includes the multiple function storage device according to statement 1, wherein the bridging device is operative to assign a tag to the second message.

Statement 24. An embodiment of the inventive concept includes the multiple function storage device according to statement 23, wherein the bridging device is operative to assign a second tag to a third message, wherein the second tag is different from the first tag.

Statement 25. An embodiment of the inventive concept includes a method, comprising:

receiving a first message from a host at an bridging device, the first message using a first protocol;

generating a second message based at least in part on the first message, the second message using a second protocol;

mapping the host to a virtual function (VF) exposed by a storage device; and sending the second message from the bridging device to the VF exposed by the storage device, wherein the storage device contemporaneously receives a third message originating from a second host.

Statement 26. An embodiment of the inventive concept includes the method according to statement 25, wherein the bridging device is implemented using at least one of a processor, a Field Programmable Gate Array (FPGA), an Application-Specific Integrated Circuit (ASIC), a Graphics Processing Unit (GPU), or a general purpose GPU (GPGPU).

Statement 27. An embodiment of the inventive concept includes the method according to statement 25, wherein the storage device implements Single-Root Input/Output Virtualization (SR-IOV).

Statement 28. An embodiment of the inventive concept includes the method according to statement 25, wherein sending the second message from the bridging device to the VF exposed by the storage device includes sending the second message from the bridging device to the VF exposed by the storage device over a Peripheral Component Interconnect Express (PCIe) connection.

Statement 29. An embodiment of the inventive concept includes the method according to statement 25, wherein receiving the first message from the host at the bridging device includes receiving the first message from the host at the bridging device at an embedded network interface controller (eNIC).

Statement 30. An embodiment of the inventive concept includes the method according to statement 29, wherein the receiving the first message from the host at the bridging device at an embedded network interface controller (eNIC) includes receiving the first message from the host at the bridging device using at least one of a wired connection, a wireless connection, or an optical connection at an embedded network interface controller (eNIC).

Statement 31. An embodiment of the inventive concept includes the method according to statement 25, further comprising:

receiving a fourth message from the host at the bridging device, the fourth message using the first protocol;

generating a fifth message based at least in part on the fourth message, the fifth message using the second protocol;

mapping the host to a second VF exposed by a second storage device; and sending the fifth message from the bridging device to the second VF exposed by the second storage device.

Statement 32. An embodiment of the inventive concept includes the method according to statement 25, further comprising:

receiving a fourth message from a second host at the bridging device, the fourth message using the first protocol;

generating a fifth message based at least in part on the fourth message, the fifth message using the second protocol;

mapping the host to a second VF exposed by the storage device; and sending the fifth message from the bridging device to the second VF exposed by the storage device.

Statement 33. An embodiment of the inventive concept includes the method according to statement 25, wherein the storage device includes a Solid State Drive (SSD).

Statement 34. An embodiment of the inventive concept includes the method according to statement 33, wherein:

the storage device includes:

a Non-Volatile Memory Express (NVMe) SSD; and an NVMe controller associated with the VF;

the second protocol includes an NVMe protocol; and the first protocol includes an NVMe Over Fabrics (NVMeoF) protocol.

Statement 35. An embodiment of the inventive concept includes the method according to statement 34, wherein:

the host includes a hypervisor and a virtual machine (VM);

mapping the host to the VF exposed by the storage device includes:

mapping the VM to the VF exposed by the storage device; and mapping the hypervisor to a physical function (PF) exposed by the storage device; and the method further comprises:

receiving a fifth message from the hypervisor at the bridging device, the fifth message using the first protocol;

generating a fourth message based at least in part on the fifth message, the fourth message using the second protocol;

sending the fourth message from the bridging device to the PF exposed by the storage device.

Statement 36. An embodiment of the inventive concept includes the method according to statement 35, wherein the fifth message includes configuration information for at least one of the bridging device and the storage device.

Statement 37. An embodiment of the inventive concept includes the method according to statement 36, wherein the configuration information includes at least one of an NVMe configuration for an NVMe controller associated with the VF, a resource allocation of the storage device for the VM, a Quality of Service (QoS) requirement for the VM, instructions to enable or disable storage functions of the storage device, or instructions to manage the storage device.

Statement 38. An embodiment of the inventive concept includes the method according to statement 34, wherein receiving the first message from the host at the bridging device includes:

receiving a write request at the bridging device from the host, the write request using the first protocol;

receiving data for the write request at the bridging device from the host; and buffering the data for the write request in a write buffer.

Statement 39. An embodiment of the inventive concept includes the method according to statement 38, wherein sending the second message from the bridging device to the VF exposed by the storage device includes sending the data for the write request from the write buffer to the VF exposed by the storage device.

Statement 40. An embodiment of the inventive concept includes the method according to statement 34, further comprising:

receiving a fourth message at the bridging device from the VF exposed by the storage device, the fourth message using the second protocol, the fourth message based at least in part on the first message;

generating a fifth message based at least in part on the fourth message, the fifth message using the first protocol;

mapping the VF exposed by a storage device to the host; and sending the fifth message from the bridging device to host.

Statement 41. An embodiment of the inventive concept includes the method according to statement 40, wherein receiving the fourth message at the bridging device from the VF exposed by the storage device includes:

receiving a read response at the bridging device from the VF exposed by the storage device host, the read response using the second protocol;

receiving data for the read response at the bridging device from the VF exposed by the storage device; and buffering the data for the read response in a read buffer.

Statement 42. An embodiment of the inventive concept includes the method according to statement 41, wherein sending the fifth message from the bridging device to the host includes sending the data for the read response from the read buffer to the host.

Statement 43. An embodiment of the inventive concept includes the method according to statement 34, wherein:

the bridging device includes:

an NVMeoF submission/completion queue pair for the VM;

a first NVMe submission/completion queue pair for the VF; and a second NVMe submission/completion queue pair for the VF; and the method further comprises using the first NVMe submission/completion queue pair for the VF and the second NVMe submission/completion queue pair for the VF to enforce a QoS requirement for the host.

Statement 44. An embodiment of the inventive concept includes the method according to statement 25, wherein:

generating the second message based at least in part on the first message includes generating a fourth message based at least in part on the first message, the fourth message using the second protocol; and sending the second message from the bridging device to the VF exposed by the storage device includes sending the fourth message from the bridging device to the VF exposed by the storage device.

Statement 45. An embodiment of the inventive concept includes the method according to statement 25, wherein receiving the first message from the host at the bridging device includes assigning a tag to the first message.

Statement 46. An embodiment of the inventive concept includes the method according to statement 45, wherein the tag assigned to the first message is different from a second tag assigned to the third message.

Statement 47. An embodiment of the inventive concept includes an device, comprising a non-transitory storage medium, the non-transitory storage medium having stored thereon instructions that, when executed by a machine, result in:

receiving a first message from a host at an bridging device, the first message using a first protocol;

generating a second message based at least in part on the first message, the second message using a second protocol;

mapping the host to a virtual function (VF) exposed by a storage device; and sending the second message from the bridging device to the VF exposed by the storage device, wherein the storage device contemporaneously receives a third message originating from a second host.

Statement 48. An embodiment of the inventive concept includes the device according to statement 47, wherein the bridging device is implemented using at least one of a processor, a Field Programmable Gate Array (FPGA), an Application-Specific Integrated Circuit (ASIC), a Graphics Processing Unit (GPU), or a general purpose GPU (GPGPU).

Statement 49. An embodiment of the inventive concept includes the device according to statement 47, wherein the storage device implements Single-Root Input/Output Virtualization (SR-IOV).

Statement 50. An embodiment of the inventive concept includes the device according to statement 47, wherein sending the second message from the bridging device to the VF exposed by the storage device includes sending the second message from the bridging device to the VF exposed by the storage device over a Peripheral Component Interconnect Express (PCIe) connection.

Statement 51. An embodiment of the inventive concept includes the device according to statement 47, wherein receiving the first message from the host at the bridging device includes receiving the first message from the host at the bridging device at an embedded network interface controller (eNIC).

Statement 52. An embodiment of the inventive concept includes the device according to statement 51, wherein the receiving the first message from the host at the bridging device at an embedded network interface controller (eNIC) includes receiving the first message from the host at the bridging device using at least one of a wired connection, a wireless connection, or an optical connection at an embedded network interface controller (eNIC).

Statement 53. An embodiment of the inventive concept includes the device according to statement 47, the non-transitory storage medium having stored thereon further instructions that, when executed by the machine, result in:

receiving a fourth message from the host at the bridging device, the fourth message using the first protocol;

generating a fifth message based at least in part on the fourth message, the fifth message using the second protocol;

mapping the host to a second VF exposed by a second storage device; and sending the fifth message from the bridging device to the second VF exposed by the second storage device.

Statement 54. An embodiment of the inventive concept includes the device according to statement 47, the non-transitory storage medium having stored thereon further instructions that, when executed by the machine, result in:

receiving a fourth message from a second host at the bridging device, the fourth message using the first protocol;

generating a fifth message based at least in part on the fourth message, the fifth message using the second protocol;

mapping the host to a second VF exposed by the storage device; and sending the fifth message from the bridging device to the second VF exposed by the storage device.

Statement 55. An embodiment of the inventive concept includes the device according to statement 47, wherein the storage device includes a Solid State Drive (SSD).

Statement 56. An embodiment of the inventive concept includes the device according to statement 55, wherein:

the storage device includes:
a Non-Volatile Memory Express (NVMe) SSD; and
an NVMe controller associated with the VF;

the second protocol includes an NVMe protocol; and the first protocol includes an NVMe Over Fabrics (NVMeoF) protocol.

Statement 57. An embodiment of the inventive concept includes the device according to statement 56, wherein:

the host includes a hypervisor and a virtual machine (VM);

mapping the host to the VF exposed by the storage device includes:

mapping the VM to the VF exposed by the storage device; and mapping the hypervisor to a physical function (PF) exposed by the storage device; and the device further comprises:

receiving a fifth message from the hypervisor at the bridging device, the fifth message using the first protocol;

generating a fourth message based at least in part on the fifth message, the fourth message using the second protocol;

sending the fourth message from the bridging device to the PF exposed by the storage device.

Statement 58. An embodiment of the inventive concept includes the device according to statement 57, wherein the fifth message includes configuration information for at least one of the bridging device and the storage device.

Statement 59. An embodiment of the inventive concept includes the device according to statement 58, wherein the configuration information includes at least one of an NVMe configuration for an NVMe controller associated with the VF, a resource allocation of the storage device for the VM, a Quality of Service (QoS) requirement for the VM, instructions to enable or disable storage functions of the storage device, or instructions to manage the storage device.

Statement 60. An embodiment of the inventive concept includes the device according to statement 56, wherein receiving the first message from the host at the bridging device includes:

receiving a write request at the bridging device from the host, the write request using the first protocol;

receiving data for the write request at the bridging device from the host; and buffering the data for the write request in a write buffer.

Statement 61. An embodiment of the inventive concept includes the device according to statement 60, wherein sending the second message from the bridging device to the VF exposed by the storage device includes sending the data for the write request from the write buffer to the VF exposed by the storage device.

Statement 62. An embodiment of the inventive concept includes the device according to statement 56, the non-transitory storage medium having stored thereon further instructions that, when executed by the machine, result in:

receiving a fourth message at the bridging device from the VF exposed by the storage device, the fourth message using the second protocol, the fourth message based at least in part on the first message;

generating a fifth message based at least in part on the fourth message, the fifth message using the first protocol;

mapping the VF exposed by a storage device to the host; and sending the fifth message from the bridging device to host.

Statement 63. An embodiment of the inventive concept includes the device according to statement 62, wherein receiving the fourth message at the bridging device from the VF exposed by the storage device includes:

receiving a read response at the bridging device from the VF exposed by the storage device host, the read response using the second protocol;

receiving data for the read response at the bridging device from the VF exposed by the storage device; and buffering the data for the read response in a read buffer.

Statement 64. An embodiment of the inventive concept includes the device according to statement 63, wherein sending the fifth message from the bridging device to the host includes sending the data for the read response from the read buffer to the host.

Statement 65. An embodiment of the inventive concept includes the device according to statement 56, wherein:

the bridging device includes:

an NVMeoF submission/completion queue pair for the VM;

a first NVMe submission/completion queue pair for the VF; and a second NVMe submission/completion queue pair for the VF; and the device further comprises using the first NVMe submission/completion queue pair for the VF and the second NVMe submission/completion queue pair for the VF to enforce a QoS requirement for the host.

Statement 66. An embodiment of the inventive concept includes the device according to statement 47, wherein:

generating the second message based at least in part on the first message includes generating a fourth message based at least in part on the first message, the fourth message using the second protocol; and sending the second message from the bridging device to the VF exposed by the storage device includes sending the fourth message from the bridging device to the VF exposed by the storage device.

Statement 67. An embodiment of the inventive concept includes the device according to statement 47, wherein receiving the first message from the host at the bridging device includes assigning a tag to the first message.

Statement 68. An embodiment of the inventive concept includes the device according to statement 67, wherein the tag assigned to the first message is different from a second tag assigned to the third message.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A bridging device, comprising:

an interface controller to receive a first message from a host, the first message using a first protocol;

a bridge circuit to generate a second message based at least in part on the first message, the second message using a second protocol, the bridge circuit including:

a first queue pair for a storage device; and a second queue pair for the storage device; and an interface to transmit the second message to a storage device, wherein the bridging device is configured to use the first queue pair and the second queue pair, the first queue pair and the second queue pair associated with a Quality of Service (QoS) requirement for the host, and wherein the first protocol is different from the second protocol.

2. The bridging device according to claim 1, wherein the interface is configured to transmit the second message to a first controller of the storage device and to transmit a third message to a second controller of the storage device.

3. The bridging device according to claim 2, wherein:

the interface controller is configured to receive a fourth message; and the bridge circuit is configured to generate the third message based at least in part on the fourth message.

4. The bridging device according to claim 3, wherein the interface controller is configured to receive the fourth message from a second remote host.

5. The bridging device according to claim 2, wherein:

the first queue pair includes a first submission/completion queue pair for the first controller of a storage device using the second protocol;

the second queue pair includes the second submission/completion queue pair for the second controller of the storage device using the second protocol; and the bridging device further comprises:

a third submission/completion queue pair for a hypervisor of the host, the third submission/completion queue pair using the first protocol; and a fourth submission/completion queue pair for a virtual machine (VM) of the host, the fourth submission/completion queue pair using the first protocol.

6. The bridging device according to claim 2, wherein:

the bridging device further comprises:

a first submission/completion queue pair for a VM of the host, the first submission/completion queue pair using the first protocol; and a second submission/completion queue pair for the VM, the second submission/completion queue pair using the second protocol; and wherein the bridging device is configured to use the first submission/completion queue pair and the second submission/completion queue pair to satisfy the QoS requirement for the VM.

7. The bridging device according to claim 1, wherein:

the host includes a hypervisor and a Virtual Machine (VM); and the interface controller is configured to receive the first message from the hypervisor and to receive a fourth message from the VM.

8. The bridging device according to claim 1, wherein the storage device includes a Solid State Drive (SSD).

9. The bridging device according to claim 1, wherein the bridge circuit is configured to generate two second messages to send to a controller of the storage device based at least in part on the first message.

10. The bridging device according to claim 1, wherein the bridging device is operative to assign a tag to the second message so that a first response to the first message may be generated by the bridge circuit based at least in part on a second response to the second message and the tag assigned to the second message.

11. A method, comprising:
receiving a first message from a host at a bridging device, the first message using a first protocol;
generating a second message based at least in part on the first message, the second message using a second protocol;
sending the second message from the bridging device to a first controller of a storage device; and
using a first submission/completion queue pair for the first controller of the storage device and a second submission/completion queue pair for the first controller of the storage device, the first submission/completion queue pair and the second submission/completion queue pair associated with a Quality of Service (QoS) requirement for the host,
wherein the bridging device is configured to send a third message to a second controller of the storage device, and
wherein the first protocol is different from the second protocol.

12. The method according to claim 11, further comprising:
receiving a fourth message at the bridging device;
generating the third message based at least in part on the fourth message; and
sending the third message from the bridging device to the second controller of the storage device.

13. The method according to claim 11, further comprising:
receiving a fourth message at the bridging device from the first controller of the storage device, the fourth message based at least in part on the first message;
generating a fifth message based at least in part on the fourth message; and
sending the fifth message from the bridging device to the host.

14. The method according to claim 13, wherein:
the fourth message includes the second protocol; and
generating the fifth message based at least in part on the fourth message includes generating the fifth message using the first protocol based at least in part on the fourth message.

15. The method according to claim 11, wherein receiving the first message from the host at the bridging device includes assigning a tag to the first message so that a first response to the first message may be generated by the bridge circuit based at least in part on a second response to the second message and the tag assigned to the second message.

16. The method according to claim 11, wherein:
the bridging device further includes:
a third queue pair for the second controller; and
a fourth queue pair for the second controller;
sending the second message from the bridging device to the first controller of the storage device includes sending the second message from the bridging device to the first controller of the storage device using one of the first submission/completion queue pair and the second submission/completion queue pair; and
the bridging device is configured to send the third message to the second controller of the storage device using one of the third queue pair and the fourth queue pair.

17. A device, comprising a non-transitory storage medium, the non-transitory storage medium having stored thereon instructions that, when executed by a machine, result in:
receiving a first message from a host at a bridging device, the first message using a first protocol;
generating a second message based at least in part on the first message, the second message using a second protocol;
sending the second message from the bridging device to a first controller of a storage device; and
using a first submission/completion queue pair for the first controller of the storage device and a second submission/completion queue pair for the first controller of the storage device, the first submission/completion queue pair and the second submission/completion queue pair associated with a Quality of Service (QoS) requirement for the host,
wherein the bridging device is configured to send a third message to a second controller of the storage device, and
wherein the first protocol is different from the second protocol.

* * * * *